United States Patent [19]

Rensch

[11] 4,067,161

[45] Jan. 10, 1978

[54] MODULAR FURNITURE

[76] Inventor: Eberhard G. Rensch, Lerchesbergring 24, 6 Frankfurt am Main, Germany

[21] Appl. No.: 615,484

[22] Filed: Sept. 22, 1975

Related U.S. Application Data

[63] Continuation-in-part of Ser. No. 407,600, Oct. 18, 1973, abandoned.

[30] Foreign Application Priority Data

Sept. 29, 1974 Germany .............................. 2445015
Aug. 2, 1975 Germany .............................. 2534552

[51] Int. Cl.² .......................... E04B 1/54; A47B 47/00
[52] U.S. Cl. ........................................ 52/285; 52/281; 52/282; 108/111; 52/619; 312/257 R; 312/263
[58] Field of Search ............................ 211/186, 189, ; 108/111, 153; 312/108, 111, 140, 263, 257 R, 257 A, 257 SK; 52/281, 282, 400, 495, 498, 499, 586, 619, 624, 626–628, 656, 732, 738, 758 R, 758 H, 280, 285, 580; 403/384, 387

[56] References Cited

U.S. PATENT DOCUMENTS

| 2,363,164 | 11/1944 | Waller | 52/282 |
|---|---|---|---|
| 3,225,502 | 12/1965 | Hallauer | 52/495 X |
| 3,250,582 | 5/1966 | Kassimir | 312/140 X |
| 3,303,626 | 2/1967 | Brigham | 52/627 X |
| 3,378,977 | 4/1968 | Vervloet | 52/656 X |
| 3,389,527 | 6/1968 | Collard | 52/495 X |
| 3,405,492 | 10/1968 | Koller | 52/285 X |
| 3,438,164 | 4/1969 | Duepree | 312/263 X |
| 3,509,673 | 5/1970 | Witkosky et al. | 52/281 X |
| 3,512,305 | 5/1970 | Multer | 52/624 X |
| 3,525,560 | 8/1970 | Gasner et al. | 312/257 R |
| 3,546,842 | 12/1970 | Blum | 52/758 H X |
| 3,608,989 | 9/1971 | Wurster et al. | 312/257 R |
| 3,779,177 | 12/1973 | Gigante | 312/108 X |
| 3,836,218 | 9/1974 | Hallal | 312/111 |
| 3,858,377 | 1/1975 | Browne et al. | 52/495 |

FOREIGN PATENT DOCUMENTS

| 2,214,015 | 10/1972 | Germany | 312/263 |
|---|---|---|---|
| 1,065,714 | 9/1959 | Germany | 312/140 |
| 442,692 | 1/1968 | Switzerland | 52/498 |

Primary Examiner—Roy D. Frazier
Assistant Examiner—William E. Lyddane
Attorney, Agent, or Firm—Karl F. Ross

[57] ABSTRACT

A piece of furniture comprises several angularly adjoining structural components, such as plates and/or bars, or polygonal outline. Each component is framed by several modular elements in the form of elongate profiles extending along respective sides of the polygon. Each profile has a wide first flange, contacting the component or integral therewith, and a second, narrower flange held spaced from this first flange by a transverse web; a still narrower third flange may be held spaced from the second flange by an extension of the web, the three flanges then having beveled edges lying in two common planes which include angles of 90° or 60° with the midplane of the profile. Adjoining profiles, whose first flanges lie in different planes, are joined by angular connectors along their longitudinal or their transverse edges, the connectors having parts received in grooves defined by pairs of parallel flanges in the first instance and in channels formed by brackets on the first flanges in the second instance.

13 Claims, 60 Drawing Figures

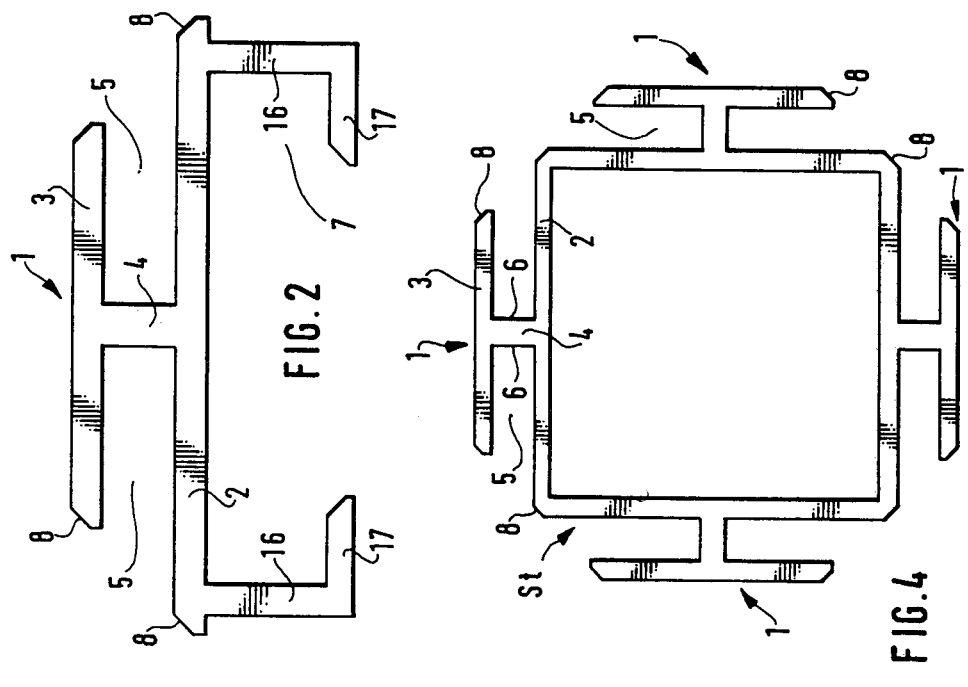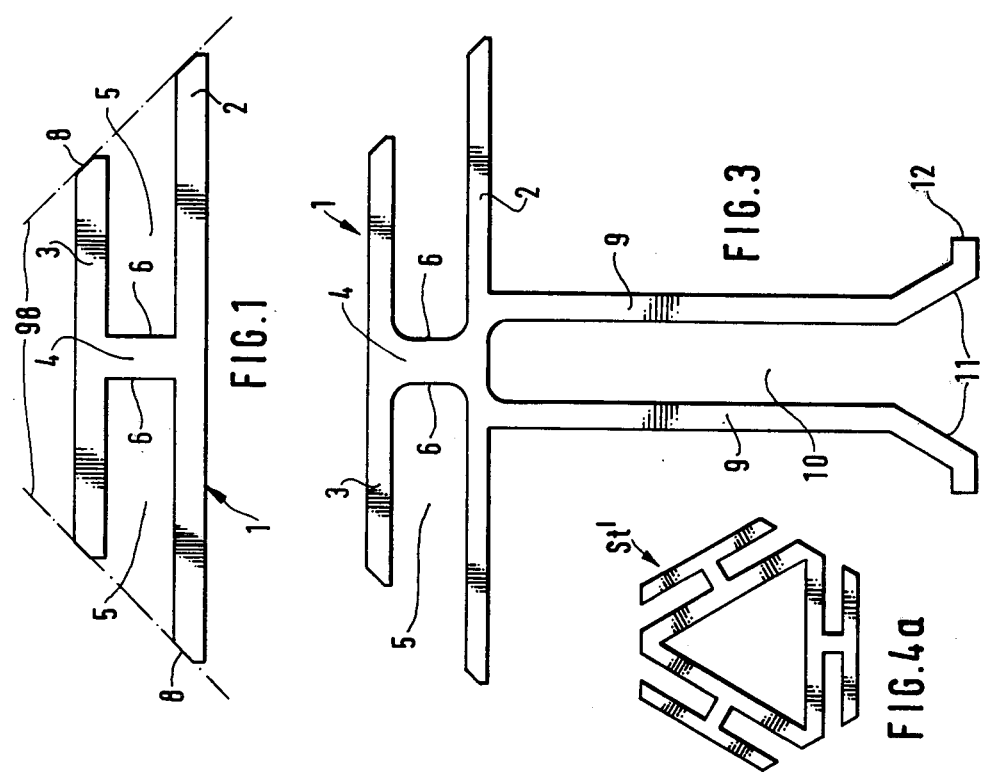

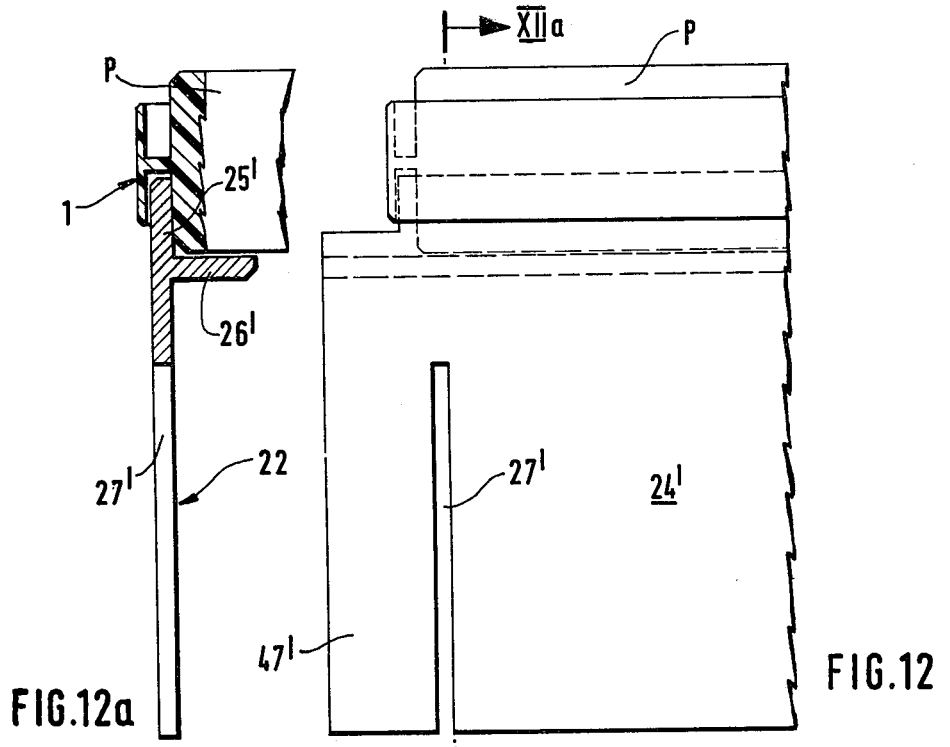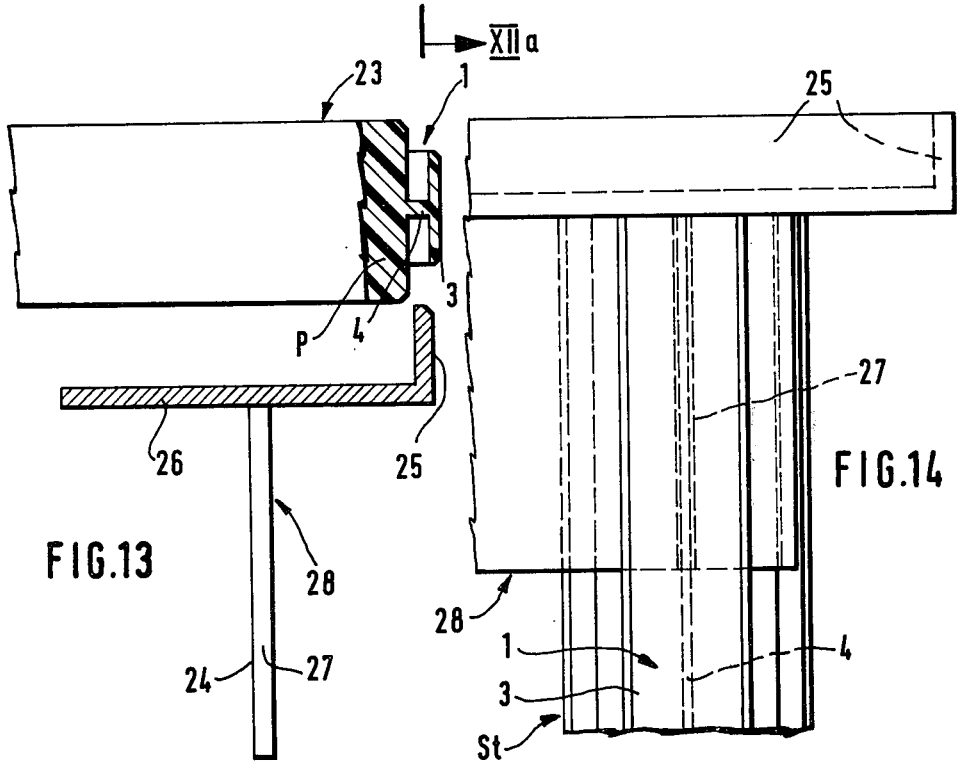

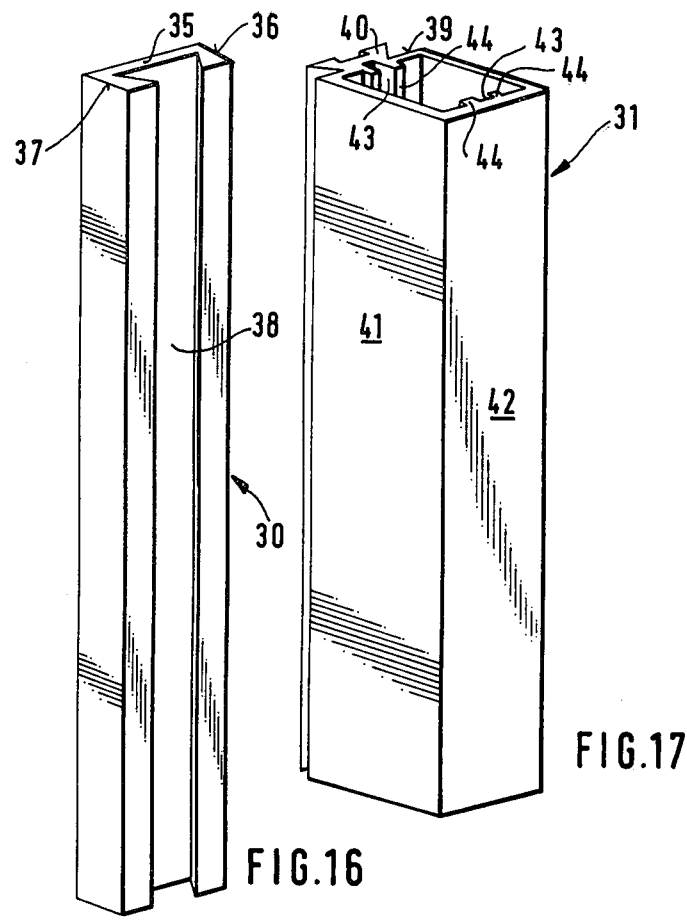
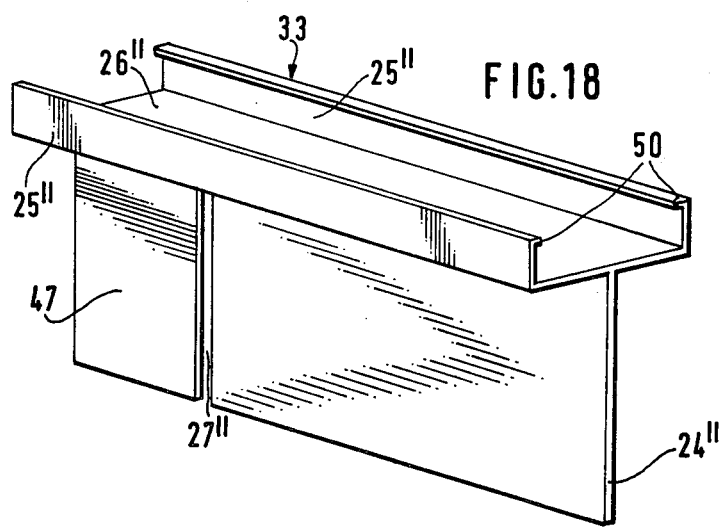

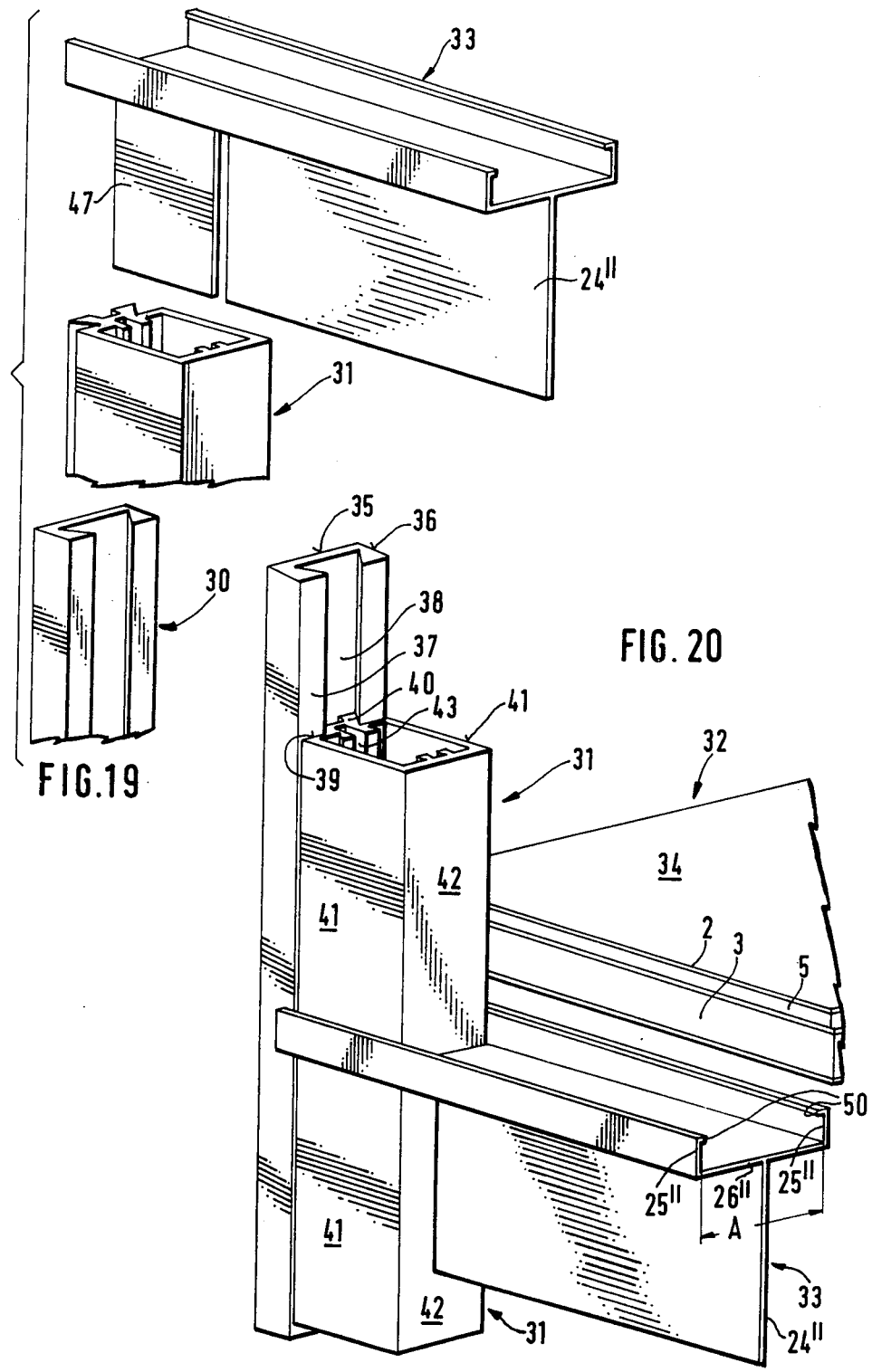

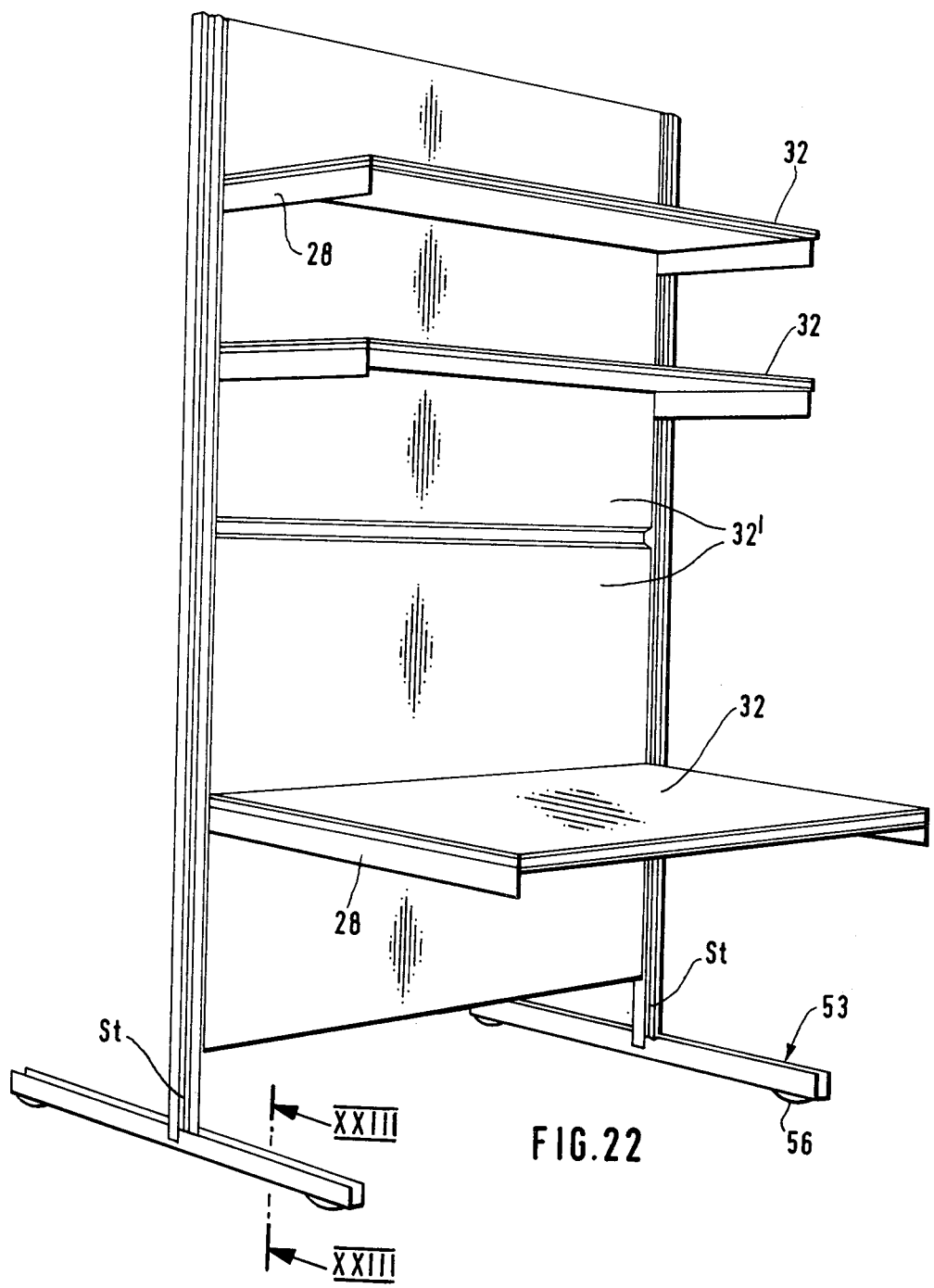

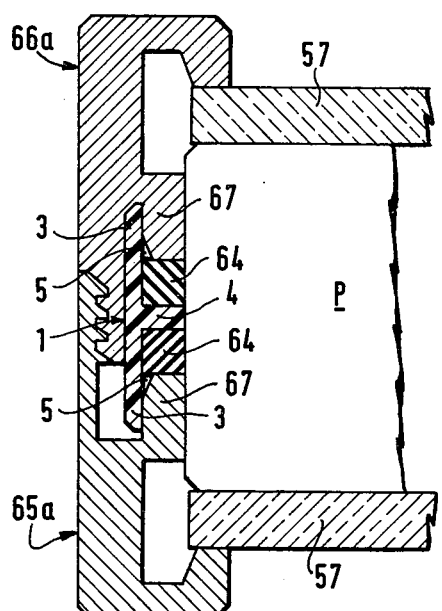
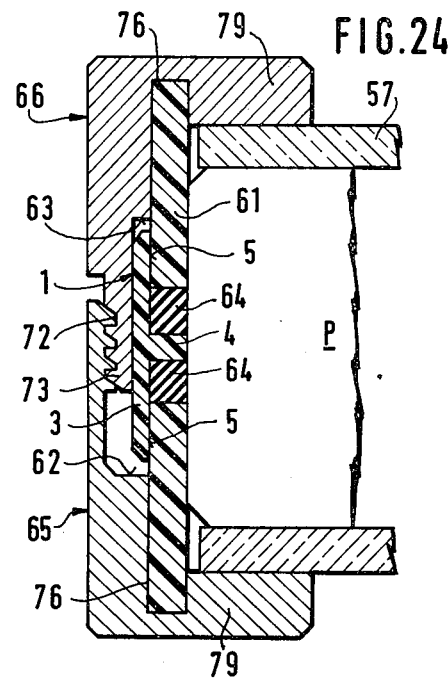
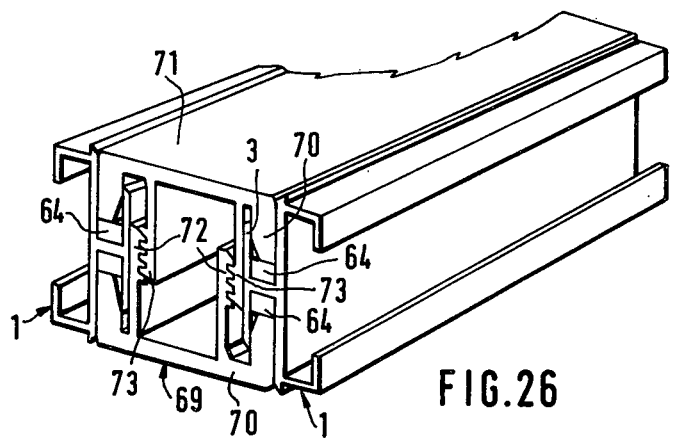
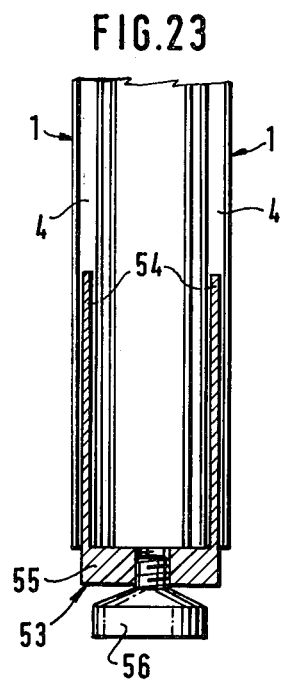

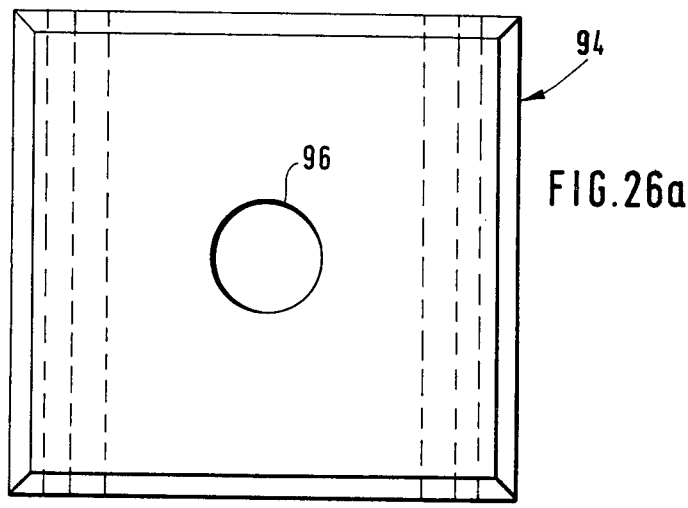
FIG.26a
FIG.26b
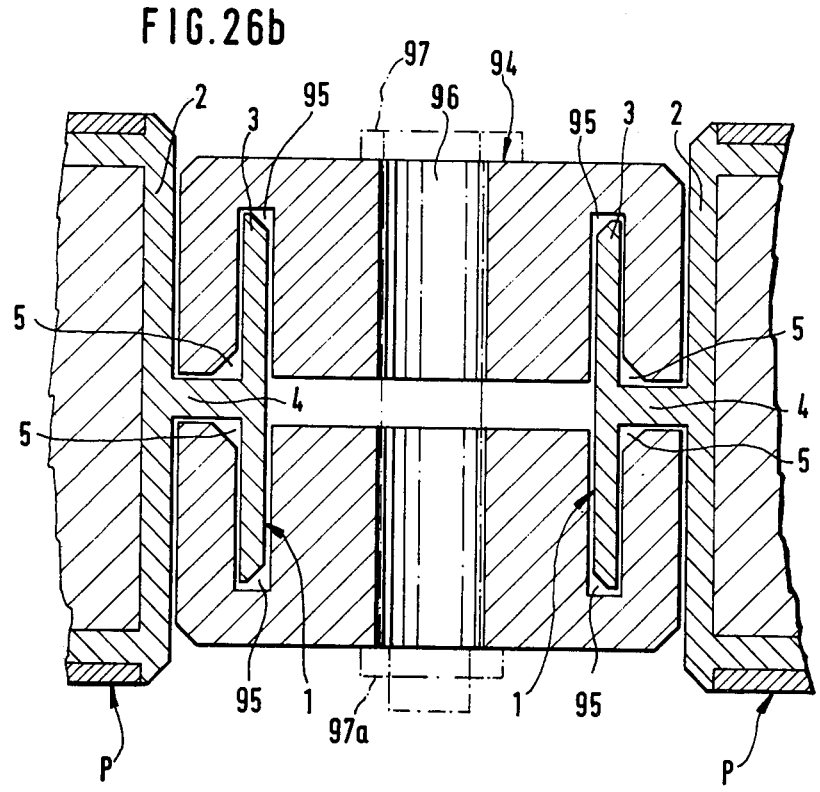

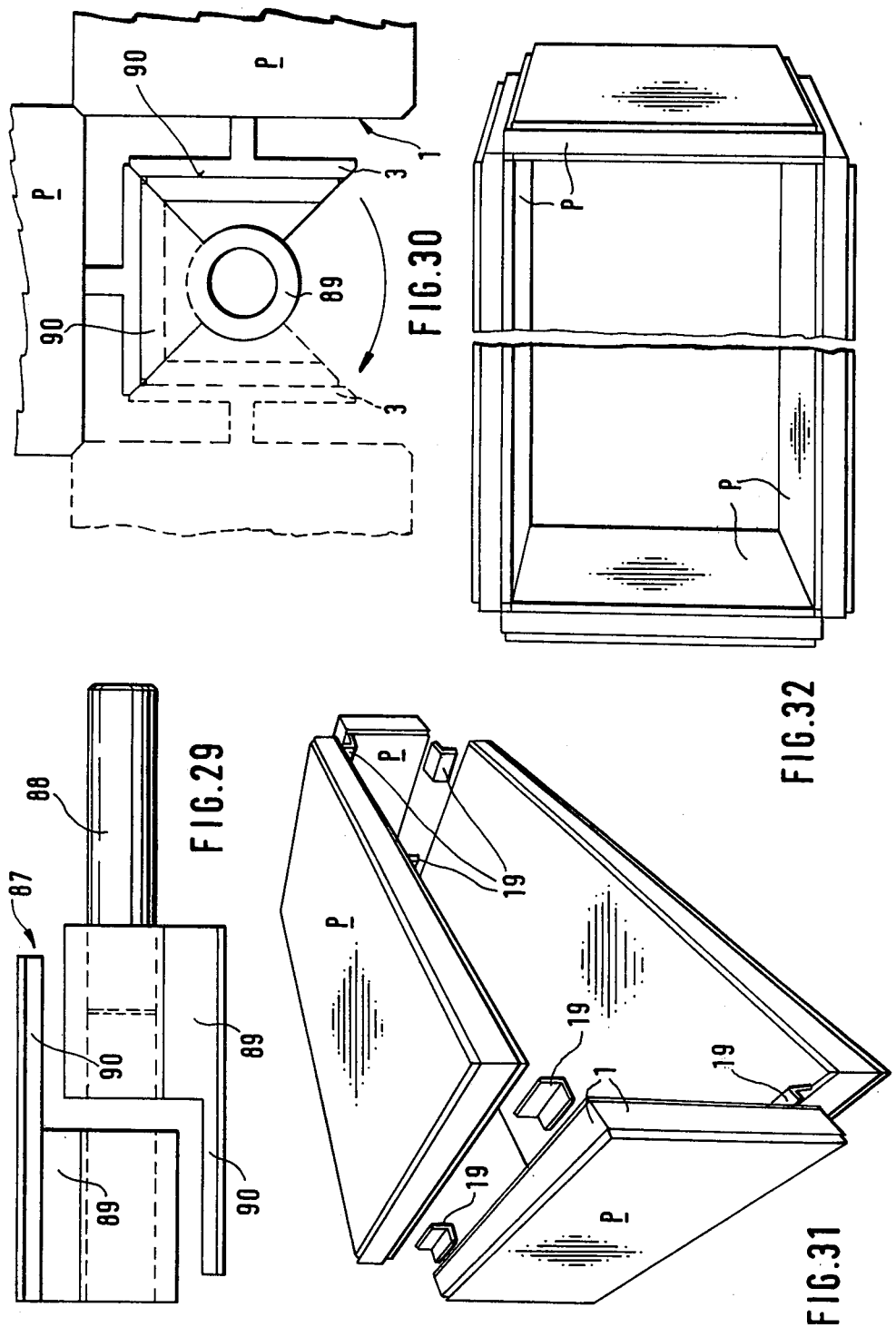

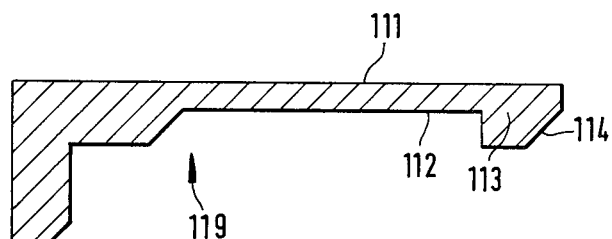// FIG.39
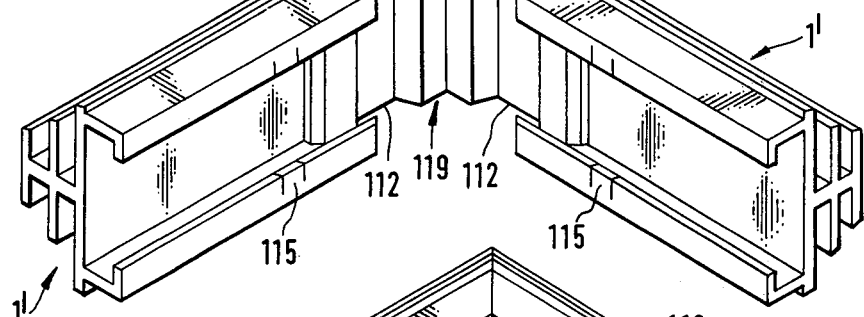// FIG.40
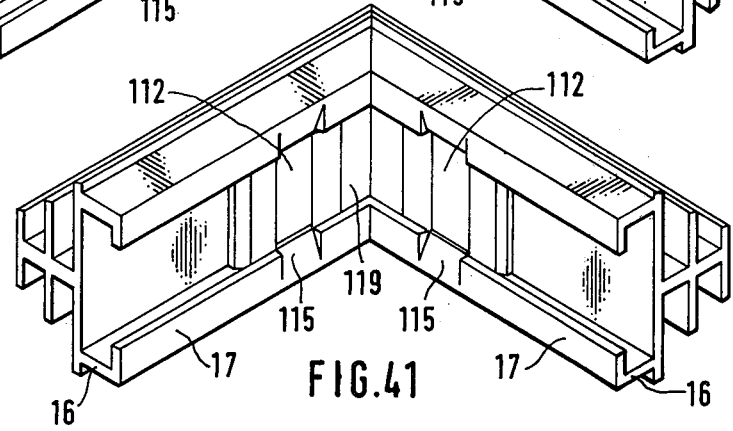// FIG.41

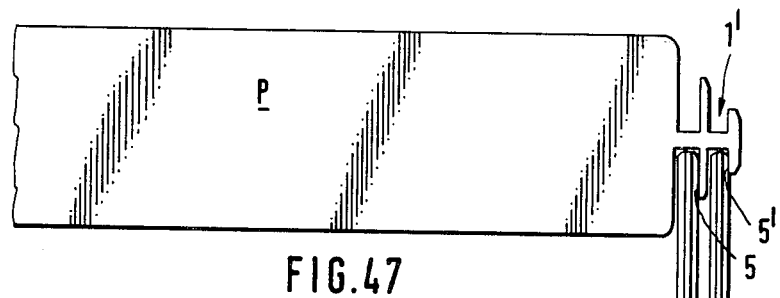
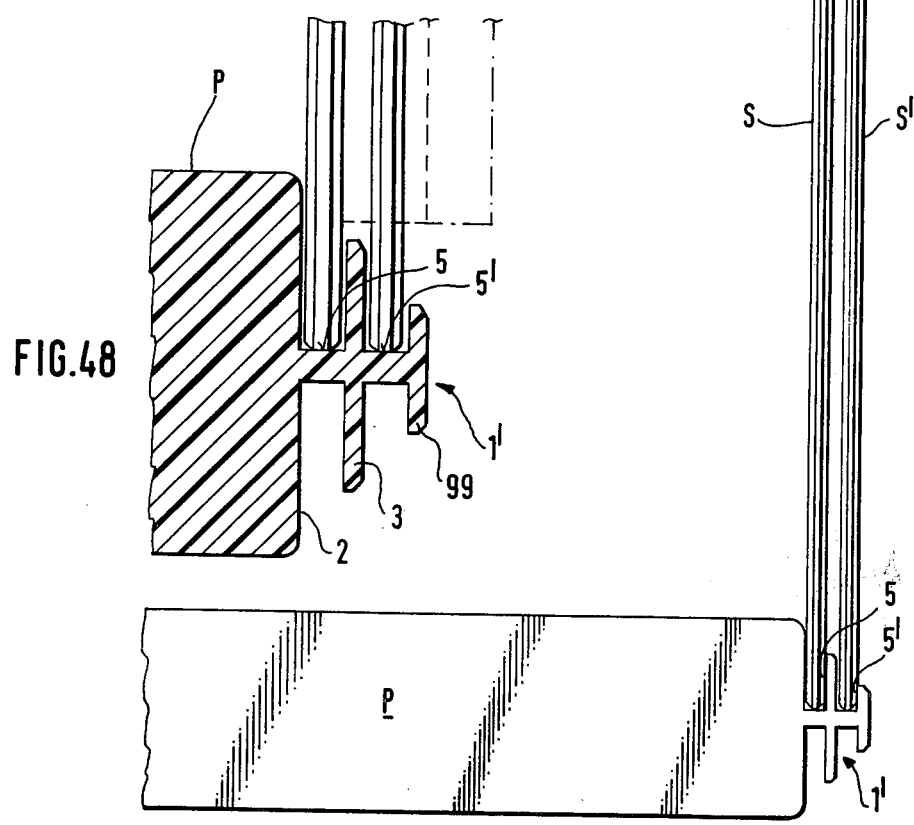
FIG.47
FIG.48

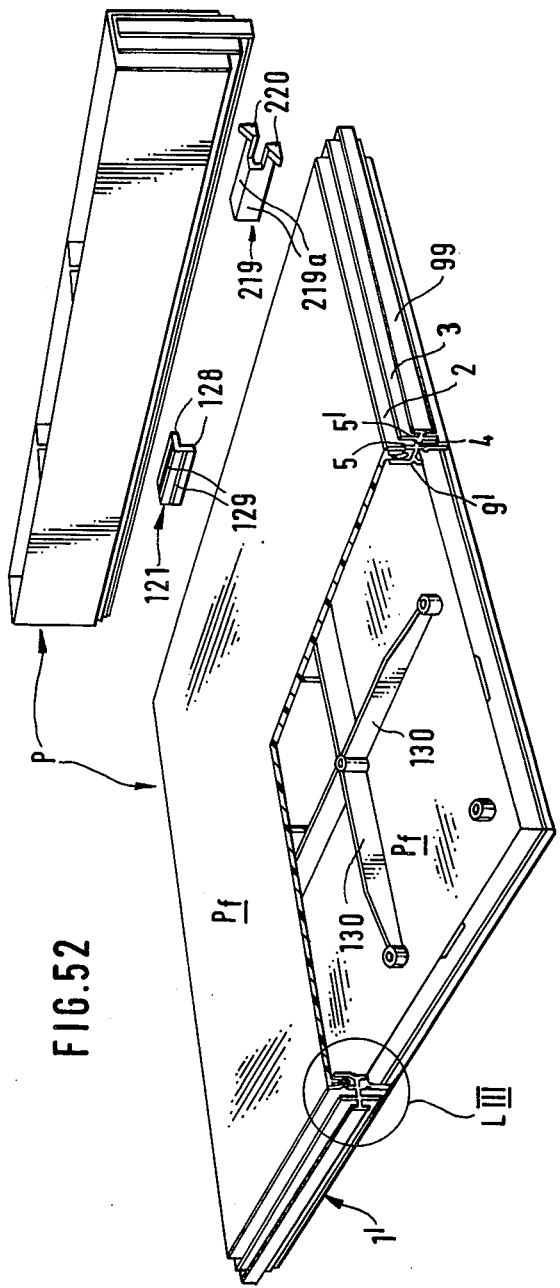

MODULAR FURNITURE

CROSS-REFERENCE TO RELATED APPLICATION

This application is a continuation-in-part of my co-pending application Ser. No. 407,600 filed 18 Oct., 1973 now abandoned.

FIELD OF THE INVENTION

My present invention relates to a piece of furniture, such as for example a table, a chair, a stool, a cabinet, a storage rack or a bookcase, having several angularly adjoining components interconnected at their edges, usually orthogonal relationship.

BACKGROUND OF THE INVENTION

Conventional units of this description, especially those having an essentially prismatic body, have plate-shaped components such as seats and backs or shelving and walls orthogonally interconnected by simple and not very reliable fasteners such as screws or nails, external attachments such as lugs or brackets, or laboriously machined formations such as mortises and tenons. The joints so formed not only tend to weaken the components but also mar the smooth exterior of the units.

OBJECTS OF THE INVENTION

An important object of my present invention, therefore, is to provide means in such a unit for reliably and firmly joining its components to one another with avoidance of unsightly projections or incisions.

Another object is to provide a set of modular elements adapted to be used in a variety of pieces of furniture without material modifications, thereby standardizing the assembly of such units and making their manufacture more economical.

It is also an object of my invention, allied with the preceding one, to provide modular elements of simple and easily reproducible shape serving not only for the interconnection of angularly (e.g. orthogonally) adjoining plates or the like but also to facilitate their attachment to other components such as table legs and similar uprights.

SUMMARY OF THE INVENTION

I realize these objects, in conformity with my present invention, by the provision of at least one modular element rigid with each component to be connected to an angularly adjoining component, this element being in the shape of an elongate profile with a plurality of parallel flanges held spaced apart by an integral transverse web, namely a first flange, a preferably narrower second flange and possibly a still narrower third flange. The first flange forms with the second flange a pair of outwardly open grooves on opposite sides of the web, a similar groove pair being defined by the second and third flanges in a three-flange profile. The first flange, defining a side of the polygon of the associated component, may be unitary with that component or firmly attached thereto, preferably by a snap fit. The adjacent components to be interconnected are angularly joined by holding means engaging their modular elements, the latter concealing the holding means by their outermost flanges contacting each other along longitudinal or transverse edges thereof.

The holding means may comprise L-shaped link members with arms or legs received in channels of the adjoining profiles, formed by brackets on their first flanges (on the side opposite the second flanges), or in the grooves of these profiles, depending on whether the profiles meet along transverse or longitudinal edges. In either case the meeting edges should be beveled or chamfered to provide a miter fit, the bevels of all flanges of a profile advantageously being coplanar whereby corresponding first, second and third flanges, if any, are in edge-to-edge contact with each other along the joint. With three-flange profiles meeting orthogonally or at some other angle at their ends, angular connectors may be inserted in both their inner grooves (between first and second flanges) and their outer grooves (between second and third flanges) for a stronger joint.

In a unit of this character wherein the interconnected components include two parallel (e.g. horizontal) plates, confronting grooves defined by coplanar flanges of respective profiles on these plates may accommodate a flat structural member such as a glass pane serving as a cabinet window or sliding door. Two such panes can be fitted into inner and outer grooves of three-flange profiles.

The aforedescribed profiles, which advantageously are assembled into sets framing the polygonal components, can also be used as anchorages for clamps or supports by which these components are secured to other such components parallel thereto or to prismatic uprights bounded by similar profiles, such as chair or table legs.

The profiles according to my invention may be made from a variety of materials, including metals, but are preferably formed by an extrusion process from thermoplastic resins.

BRIEF DESCRIPTION OF THE DRAWING

The above and other features of my invention will now be described in detail with reference to the accompanying drawing in which:

FIG. 1 is an end view of a modular element with a two-flange profile according to my invention;

FIGS. 2 and 3 are end views of similar elements provided with brackets;

FIG. 4 is an end view of a four-sided upright with profiles of the type shown in FIG. 1;

FIG. 4a is a similar view of a three-sided upright of this type;

FIG. 12 is a partial elevational view of a brace designed to support a plate framed by profiles as shown in FIG. 1;

FIG. 12a is a cross-sectional view taken on the line XIIa—XIIa of FIG. 12;

FIG. 13 is a cross-sectional view similar to FIG. 12a, showing a modified brace together with part of a plate to be mounted thereon;

FIG. 14 is a partial elevational view of the brace of FIG. 13 fitted onto an upright as shown in FIG. 4;

FIG. 16 is a perspective view of a wall rail for the rack of FIG. 15;

FIG. 17 is a perspective view of a vertical spacer included in the rack;

FIG. 18 is a perspective view of a brace similar to that shown in FIGS. 13 and 14;

FIG. 19 is an exploded perspective view of an assembly of the members shown in FIGS. 16–18;

FIG. 20 is a perspective view of the assembly of FIG. 19 about to be fitted to a shelf;

FIG. 22 is a perspective view of a display rack having a structure generally similar to that of the rack of FIG. 15;

FIG. 23 is an enlarged cross-sectional detail view taken on the line XXIII—XXIII of FIG. 22;

FIG. 24 is a cross-sectional view of a clip serving to secure two facing panels to a plate framed by profiles according to my invention;

FIG. 25 is a view similar to FIG. 24, illustrating a modified clip;

FIG. 26 is a perspective view of a clamp for interconnecting two such profiles positioned back-to-back;

FIGS. 26a and 26b are a top view and a cross-sectional view, respectively, of a modified clamp of the type shown in FIG. 26, with partial illustration of two coplanar plates carrying the back-to-back profiles;

FIG. 28 is a fragmentary elevational view of a wall structure assembled from members shown in FIGS. 12 and 12a;

FIG. 29 is a side view of a hinge for swingably interconnecting two plates framed by profiles according to my invention;

FIG. 30 is an end view of the hinge shown in FIG. 29;

FIG. 31 is a perspective view of a prismatic compartment about to be assembled from four plates in accordance with my invention;

FIG. 32 is a perspective view of the assembled compartment of FIG. 31;

FIG. 39 is a cross-sectional view of an elbow-shaped connector similar to that of FIGS. 7–9;

FIGS. 40 and 41 are perspective views similar to FIGS. 7 and 8, showing the combination of two profiles according to FIG. 36 with the connector of FIG. 39, in partly and fully assembled condition, respectively;

FIG. 47 is a fragmentary cross-sectional view of a cabinet, built from plates of the type shown in FIG. 42, with two glass panes;

FIG. 48 is an enlarged cross-sectional view of a detail of the assembly of FIG. 47;

FIG. 52 is a perspective view showing two hollow orthogonal plates and associated connectors with parts broken away.

SPECIFIC DESCRIPTION

Figure 5:
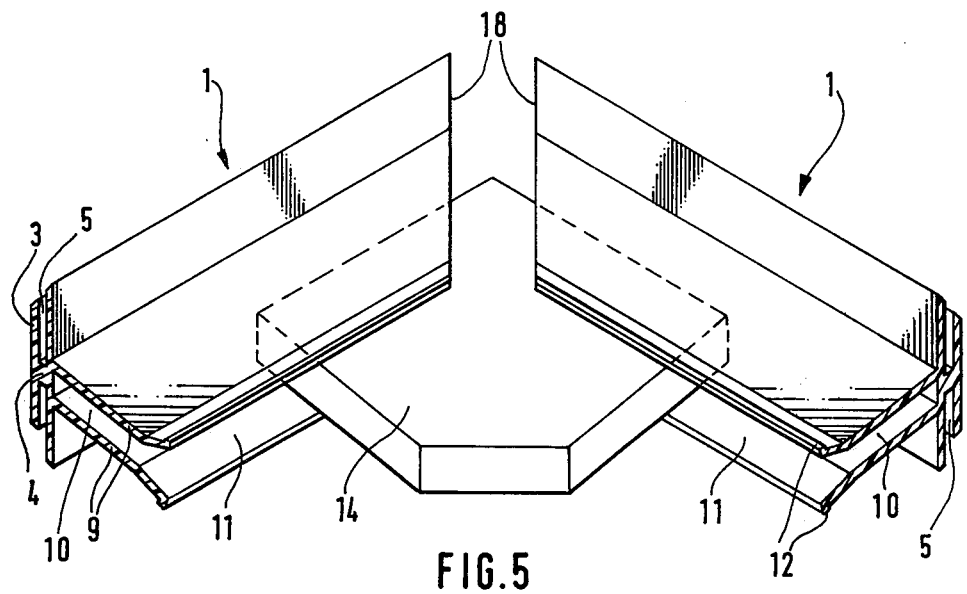
FIG. 5 is a fragmentary perspective view of two orthogonally adjoining modular elements, as shown in FIG. 3, about to be interconnected by a flat chip at the corner of a frame.

In FIG. 1 I have shown a modular element 1 in the shape of an extruded profile with a wider first flange 2, a narrower second flange 3 and a web 4 integral therewith. Two laterally open grooves 5 are defined by the flanges 2, 3 and the web 4, the web surfaces 6 constituting the closed groove bottoms. The longitudinal edges of the two flanges are beveled at 8, these bevels lying in two symmetrical planes 98 including an angle of 45° with the midplane M (see FIG. 36) of the profile. The transverse edges of the profile at the ends of the flanges may be similarly beveled as indicated at 18 (FIGS. 5–8), with the narrower flange 3 overhanging the wider flange 2 to form a miter joint.

In FIG. 2 the profile 1 is shown provided with two angled brackets 16 extending integrally from flange 2 on the side opposite flange 3, these brackets having bent-over lips 17 parallel to the flanges. The brackets 16 and the flange 2 form a channel 7 which is open at its ends and along a wide slot between the lips 17.

FIG. 3 shows the profile 1 provided with symmetrical brackets 9 extending generally parallel to web 4 and terminating in diverging extremities 11 with lips 12, these brackets bounding a channel 10 also open at its ends and on the side remote from flange 2.

FIG. 4 illustrates a unitarily extruded prismatic bar St of square cross-section whose four walls are formed by the wider flanges 2 of respective profiles 1. The junctions of flanges 2 at the edges of the prism have common bevels 8 coplanar with those of adjoining flanges 3.

FIG. 4a indicates the possibility of constructing bars of polygonal cross-section with less or more than four sides, here specifically a bar St' composed of three profiles whose wider flanges define a cross-section in the form of an equilateral triangle.

Figure 6:
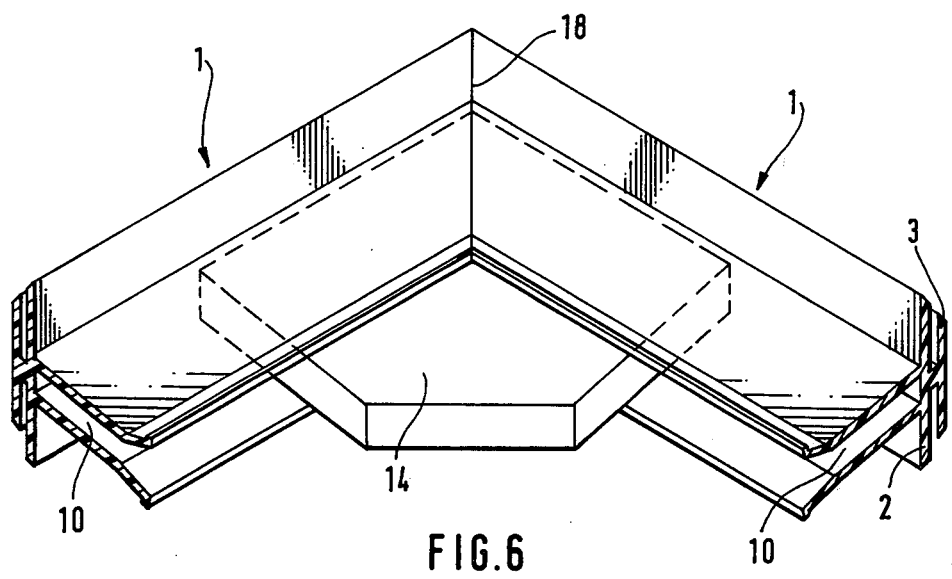
FIG. 6 is a view similar to FIG. 5, showing the completed frame corner.
Figure 9A:
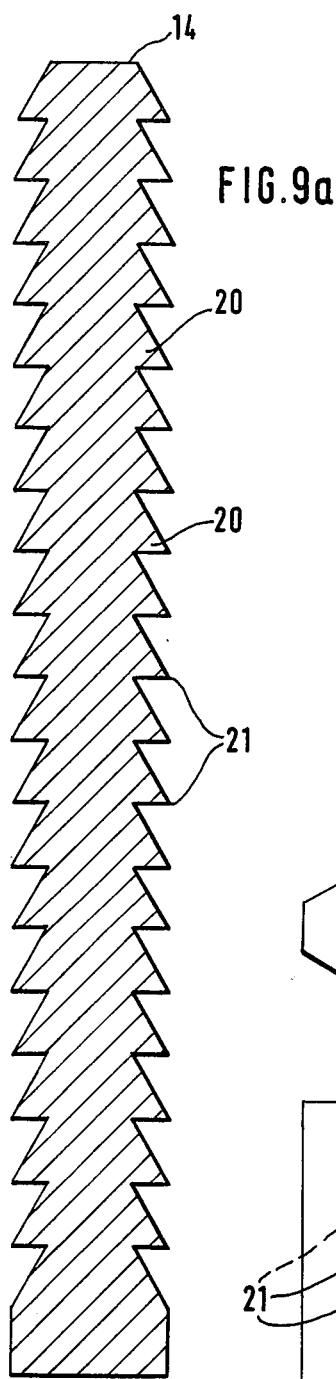
FIG. 9a ia a greatly enlarged cross-sectional view taken on the line IXa—IXa of FIG. 9.
Figure 9:
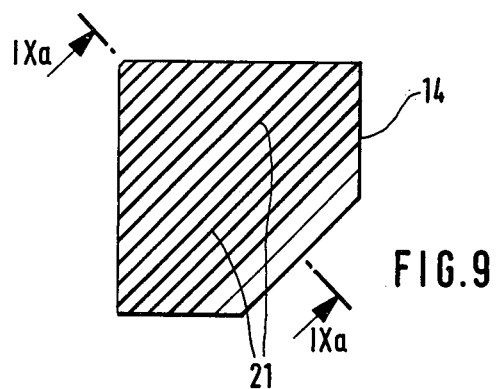
FIG. 9 is a face view of the chip linking the frame elements of FIGS. 5 and 6.

In FIGS. 5 and 6 two orthogonally adjoining profiles 1, of the type illustrated in FIG. 3, are shown interconnected by a flat (e.g. metallic) chip 14 engaging in their channels 10. The chip 14 advantageously has serrated faces 20 (see FIGS. 9 and 9a), the ridges 21 of their sawteeth biting into the confronting surfaces of the channel-forming brackets 9 to prevent dislodgment of the chip. Upon completion of the assembly (FIG. 6) the chip 14 is fully concealed from the outside by the flanges 2 and 3 whose transverse edges, like those of brackets 9, meet in the plane of the miter joint 18.

Figure 7:
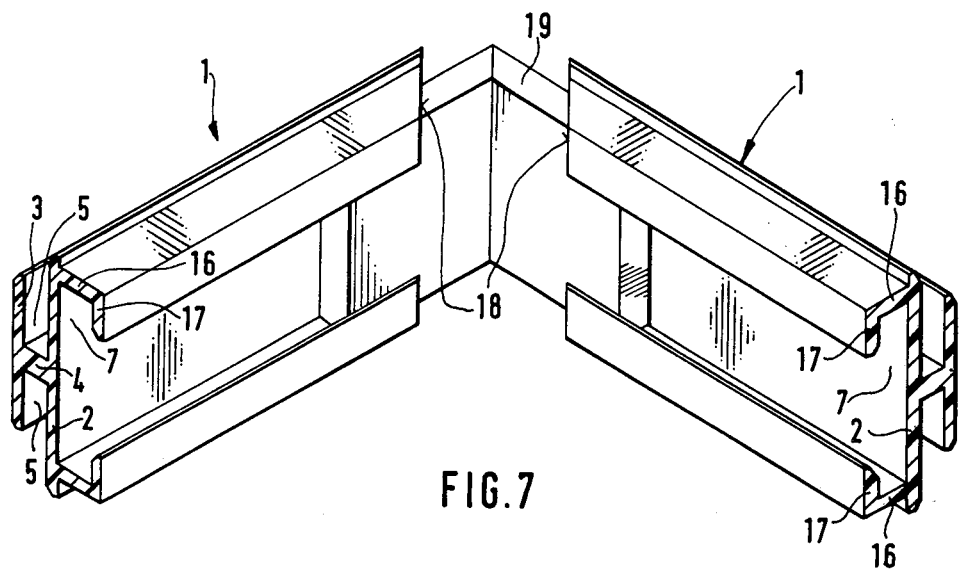
FIGS. 7 and 8 are views similar to FIGS. 5 and 6, respectively, showing part of a frame composed of elements of the type illustrated in FIG. 2 interconnected by an elbow.
Figure 8:
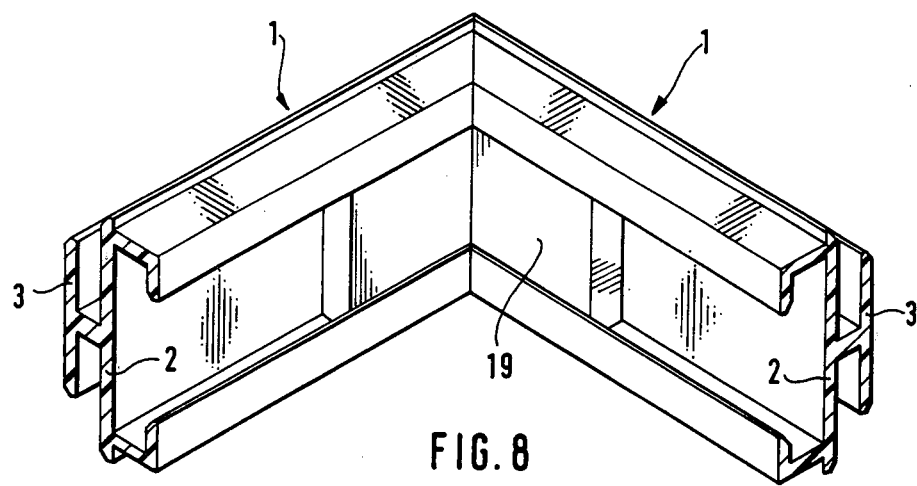
Figure 10A:
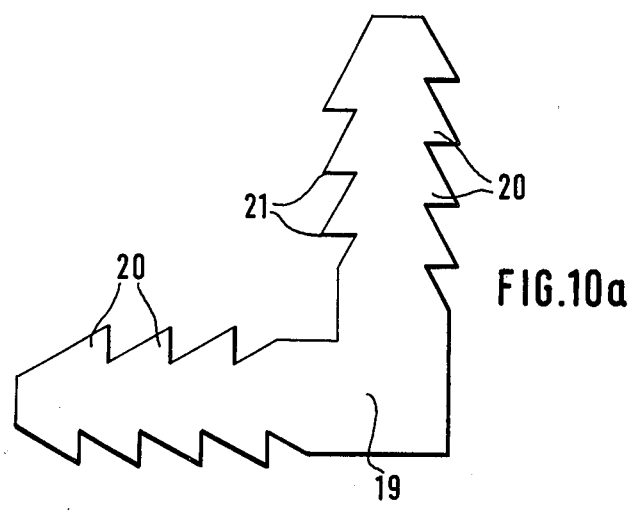
FIG. 10 is a top view and FIG. 10a is a side view of the elbow linking the frame elements of FIGS. 7 and 8.
Figure 10:
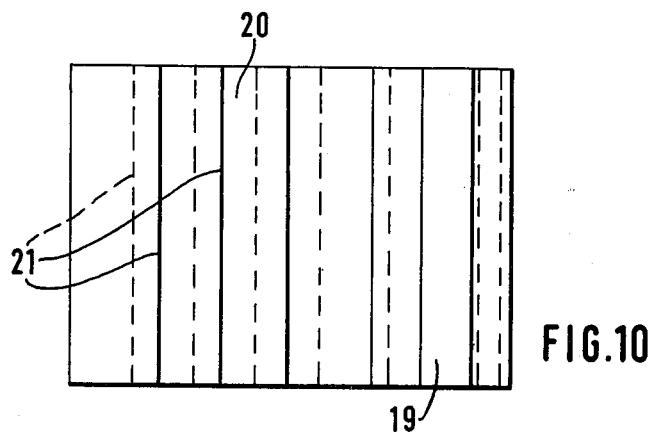

FIGS. 7 and 8 illustrate a similar assembly wherein, however, the chip 14 has been replaced by an elbow 19 whose mutually perpendicular arms are inserted endwise into the channels 7 of two profiles 1 of the type depicted in FIG. 2. The elbow-shaped connector 19 can also be provided with serrations 20 having extraction-preventing sawtooth ridges 21 as shown in FIGS. 10 and 10a. Naturally, the connectors 14 and 19 may be suitably modified for profiles adjoining each other at angles other than 90°.

Figure 11:
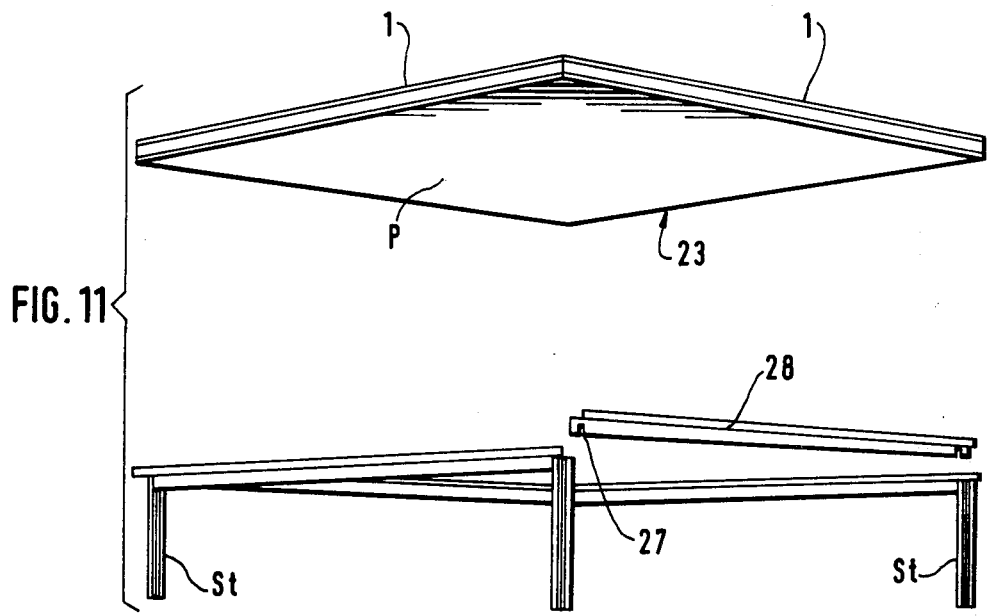
FIGS. 11 and 11a are perspective views of a table, framed by a set of elements as shown in FIGS. 5-8, prior to and after assembly, respectively.
Figure 11A:
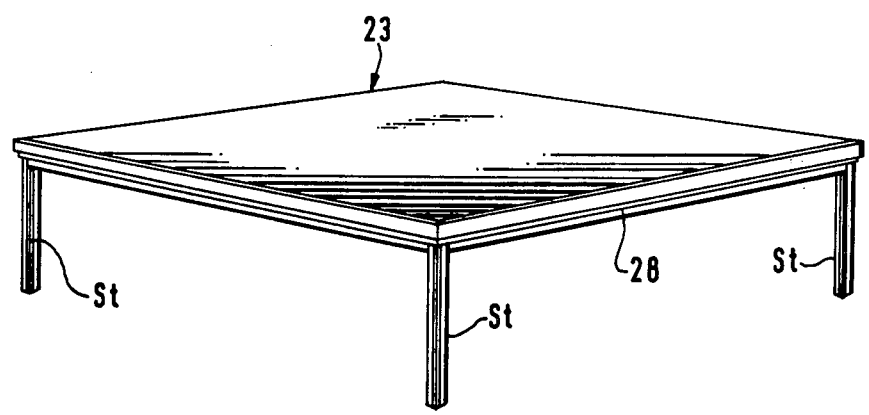

In FIGS. 11 and 11a I have shown the assembly of a table from four uprights St of the type described with reference to FIG. 4, four braces 28 with slits 27 designed to receive the upper ends of the webs 4 of these uprights as more clearly shown in FIGS. 13 and 14, and a tabletop 23 consisting of a plate P framed by four profiles 1. The wide flanges of these profiles may be unitary with the plate body, as indicated in FIG. 13, yet they could also be secured thereto by interengaging formations such as those illustrated in FIG. 53 and described hereinafter. The brace 28, as will be apparent from FIGS. 13 and 14, comprises a horizontal platform 26 with a sill 25, engaging in the lower groove 5 of one of the frame profiles 1 of tabletop 23, and with a depending apron 24 near the ends of which the slits 27 are formed. The tops of the webs 4 of the two outer profiles 1 of each upright St, serving as a table leg, are straddled by the aprons 24 of two orthogonally adjoining braces 28 whose sills 25, meeting in a miter joint, have been referenced in FIG. 14.

FIGS. 12 and 12a show a slightly different supporting member or brace 22 having an apron 24' and a sill 25' coplanar therewith, a ledge 26' extending horizontally from their junction to form a rest for the associated plate P. The apron 24' has a vertical slit 27' near each end which may be engaged by a clip 65, 66, FIG. 28, more fully described hereinafter with reference to FIG. 24. Slit 27' separates the major part of apron 24' from a section 47' thereof.

Figure 15:
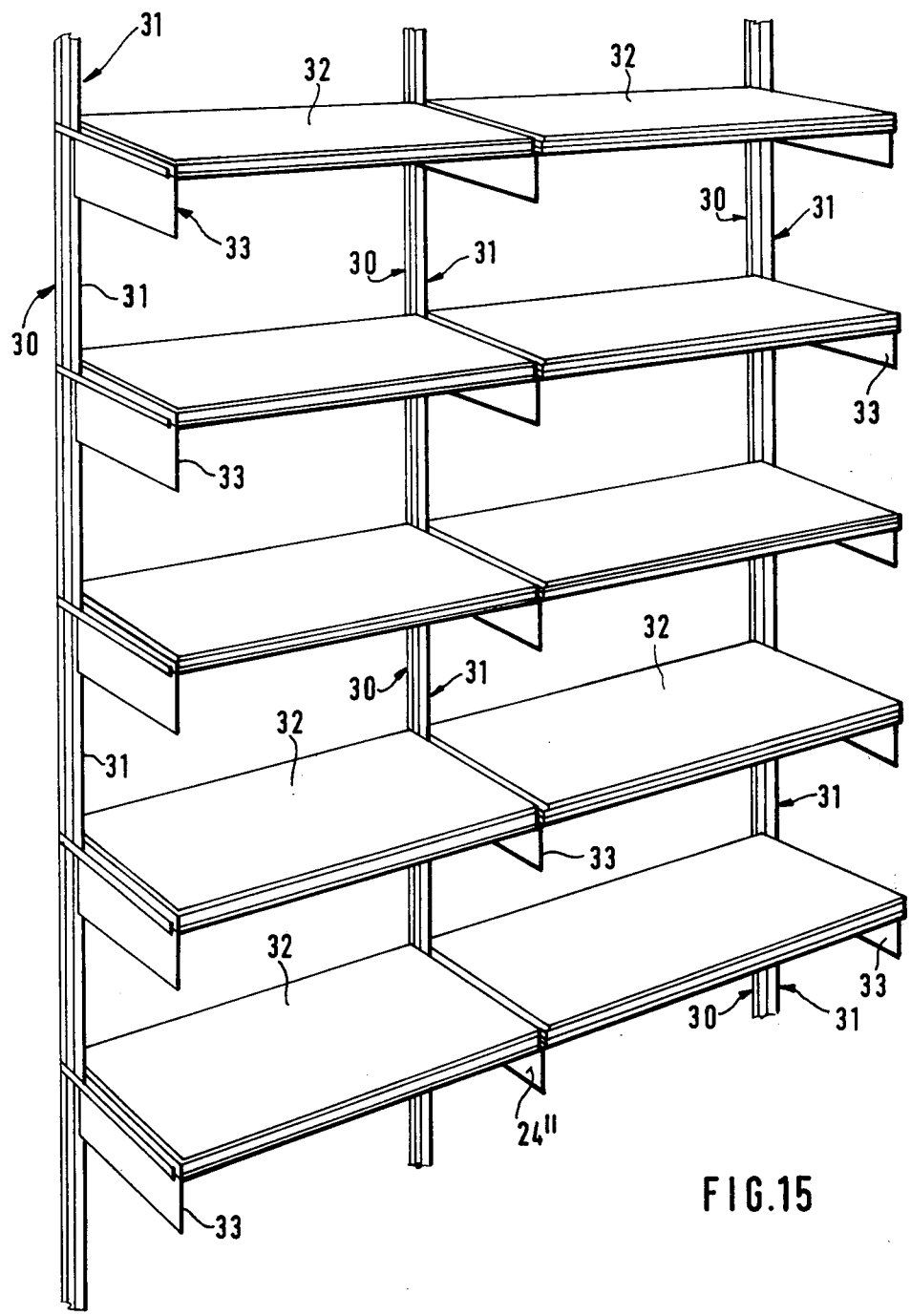
FIG. 15 is a perspective view of a wall rack assembled from structural members of type shown in FIGS. 12–14.
Figure 21:
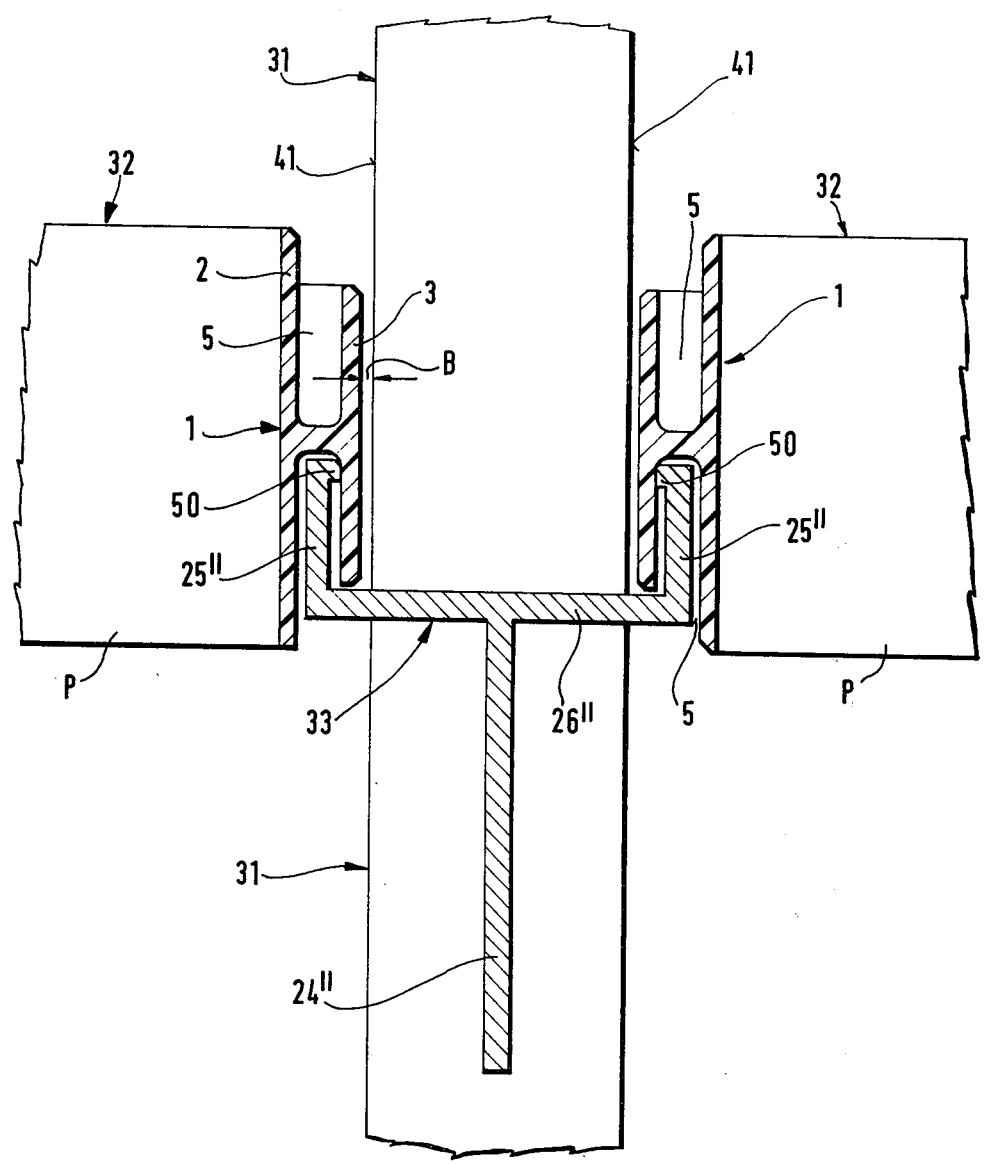
FIG. 21 is a fragmentary cross-sectional view, drawn to a larger scale, of a joint between the members of FIGS. 16–19 including two shelves.

In FIG. 15 I have shown a storage rack assembled from vertical rails 30 adapted to be secured to a wall of a room, uprights 31 serving as vertical spacers for a multiplicity of shelves 32, and supporting members 33 generally similar to braces 28 of FIGS. 13 and 14. As clearly seen in FIG. 16, each rail 30 has a dovetail-shaped vertical slot 38 bounded by a rear wall 35 and two cheeks 36, 37; like the profiles 1, these rails may be either resinous or metallic and are preferably produced by extrusion. Each spacer 31, as more fully illustrated in FIG. 17, is a similarly produced prismatic body with a rear wall 39 confronting an associated rail 30, sidewalls 41 and a front wall 42. Rear wall 39 has outer ribs 40 of dovetail shape slidably fitting into the complementary slot 38 of the rail 30. Inner ribs 44 on the front and rear walls form vertical guide slots 43 for a section 47 of an apron 24" of an associated brace 33 (FIG. 18) separated from the major part of that apron by a vertical slot 27"; apron 24" thus straddles the top of front wall 42 of spacer 31 on which a platform 26" of member 33 comes to rest, this platform having two parallel sills 25" terminating in edge beads 50. As seen in FIG. 21, the sills 25" enter the lower grooves 5 of profiles 1 forming part of respective shelves 32 which consist of plates P framed by four profiles each, the structure of these shelves being thus essentially the same as that of tabletop 23 in FIG. 11. Edge beads 50 have sharp ridges biting into the inner surfaces of profile flanges 3 to hold the assembled members 30–33 of FIGS. 19–21 together; the separation A (FIG. 20) of sills 25" is greater than the width of spacers 31 so that small clearances B (FIG. 21) remain between these spacers and the flanking profiles 1.

Figure 27:
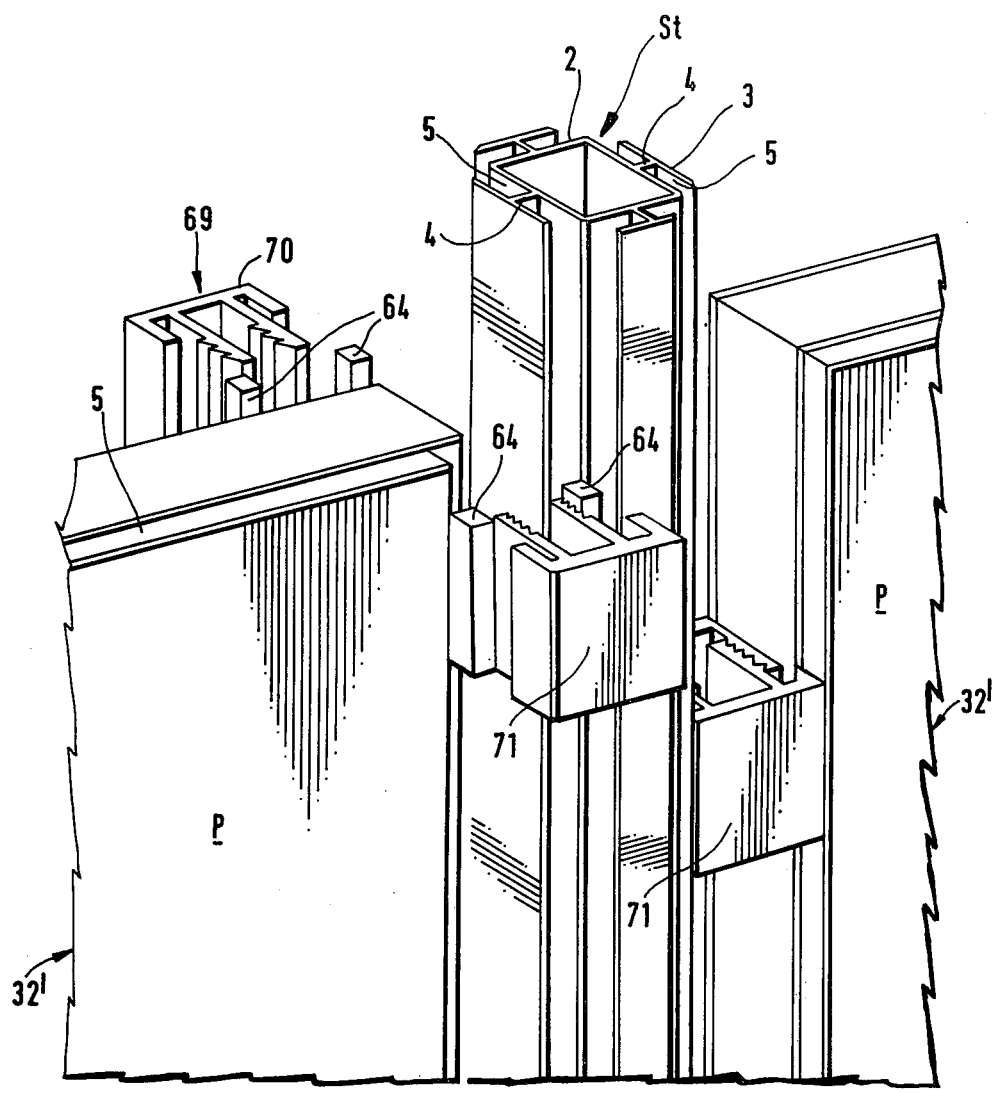
FIG. 27 is a perspective view of a wall structure assembled from uprights and plates, of the type shown in preceding Figures, with the aid of clamps as illustrated in FIG. 26.

FIG. 22 shows a display rack assembled from both horizontal and vertical components 32, 32', forming shelves and back plates, as well as uprights St and braces 28, the latter supporting the shelves 32 while engaging the profile webs of the next-lower back plates 32' in the manner described above with reference to tabletop 23 and uprights St (FIGS. 13 and 14). The vertical components or back plates 32', whose construction corresponds to that of the horizontal components or shelves 32, can be connected with the uprights St by means of C-clamps 69 as shown in FIG. 27. Adjoining back plates 32' can be interconnected by similar clamps, as illustrated in FIG. 26 or in FIGS. 26a, 26b.

The uprights St of FIG. 22 rise from transverse bars 53 of U-shaped cross-section as best seen in FIG. 23, the arms 54 of the "U" having vertical slots to receive the webs 4 of opposite profiles 1 of these uprights; this assembly is thus the reverse of that illustrated in FIG. 14. The bottoms 55 of bars 53 are provided with leveling screws 56 at their ends.

FIG. 24 illustrates the possibility of securing a pair of facings 57, such as glass panels, to a plate P constituting the body of one of the aforedescribed flat components framed by profiles 1. A clip consisting of two halves 65, 66 reaches around an edge of the plate, the two resilient clip halves being provided with coacting sawteeth 72, 73 engaging each other outside the flange 3 of the profile 1 which extends along that plate edge. Jaws 79 of these clip halves then bear under pressure upon the facings 57 to hold them firmly against the major surfaces of the plate P. These jaws have grooves 76 which are aligned with the grooves 5 of profile 1 and receive strips 61 of slip-resistant synthetic material bearing upon resilient pads 64 in grooves 5. Recesses 62, 63 in clip halves 65, 66 accommodate respective halves of flange 3.

In FIG. 25 I have shown a modified clip whose halves 65a, 66a press two facings 57 against a plate P in the manner described above, the two clip halves having integral lugs 67 which extend into the grooves 5 to compress the pads 64.

FIG. 26 shows the aforementioned clamp 69 as comprising two C-shaped jaws 70, 71 reaching into the grooves of two confronting profiles 1 of the type shown in FIG. 2, these jaws bearing upon pads 64 while interlocking with the aid of mating sawteeth 72, 73 in essentially the manner described with reference to the clips of FIGS. 24 and 25. FIG. 27 illustrates two such clamps (one of them shown in a disassembled condition) serving to secure a pair of vertical components 32' to a common upright St.

FIGS. 26a and 26b depict a modified clamp 94 adapted to be used in lieu of clamp 69 in the assemblies of FIGS. 26 and 27. This clamp 94 has two symmetrical jaws reaching into the grooves 5 of the engaged profiles 1 from opposite sides, the jaws being formed with a throughgoing bore 96 designed to receive a bolt 97 which holds them together by means of a nut 97a.

Figure 28:
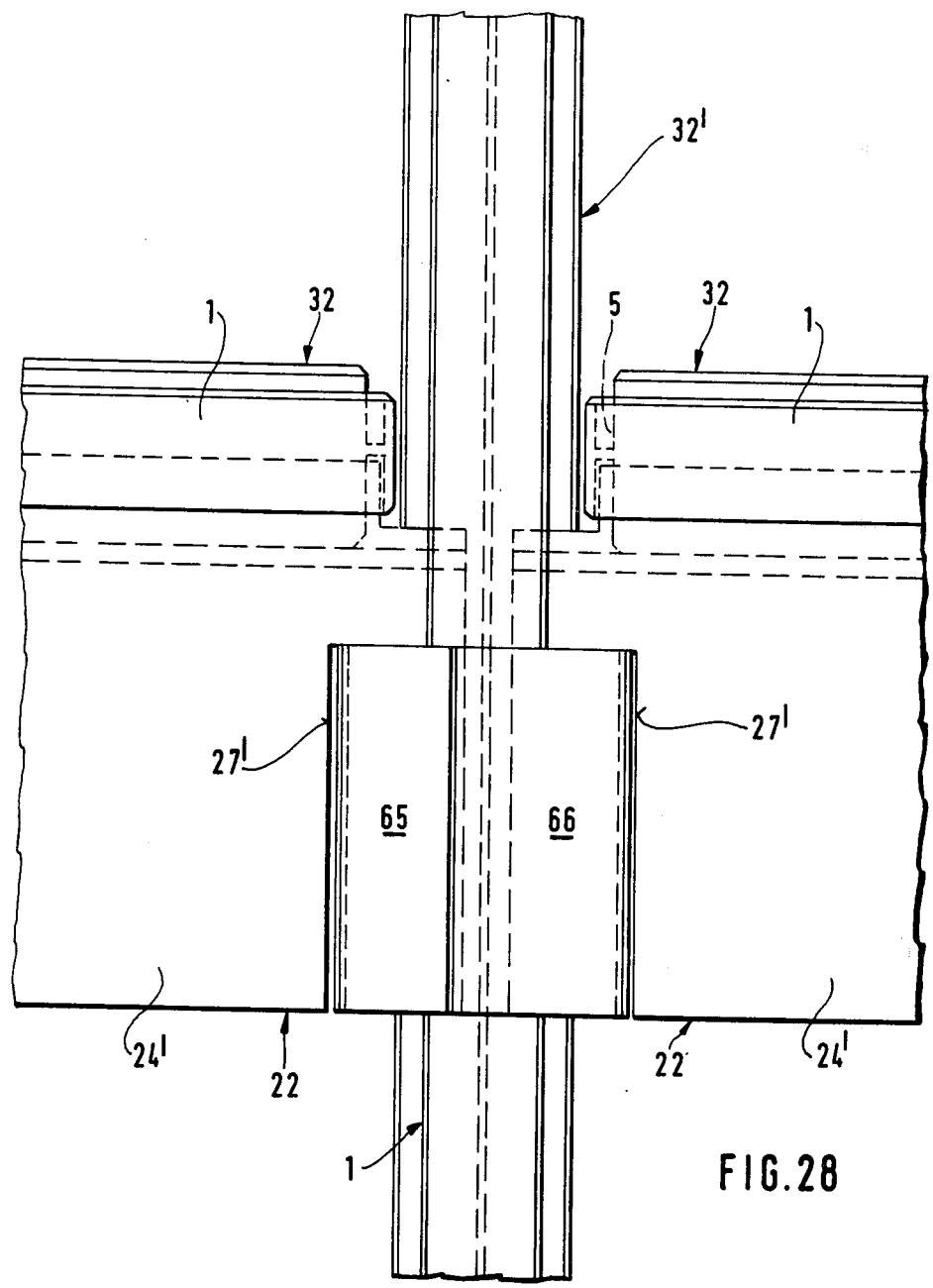

In the assembly of FIG. 28 the jaws 65, 66 are inserted into slits 27' of two braces 22 whose apron sections 47' (cf. FIG. 12) come to rest in the grooves 76 (FIG. 24). Aprons 24' also enter the grooves 5 of a profile 1 forming part of a vertical component 32', two flanking horizontal components 32 being supported on the braces 22 in the manner illustrated in FIGS. 12 and 12a.

FIGS. 29 and 30 show a hinge 87 with a pintle 88 receivable in the bores of two eyes 89. Bases 90 of eyes 89 can be cemented or otherwise secured to flanges 3 of a pair of profiles 1 rigid with a pair of plates P which can thus be swung relatively to each other, through an angle of 180° as illustrated in dashed lines in FIG. 30.

Figure 33:
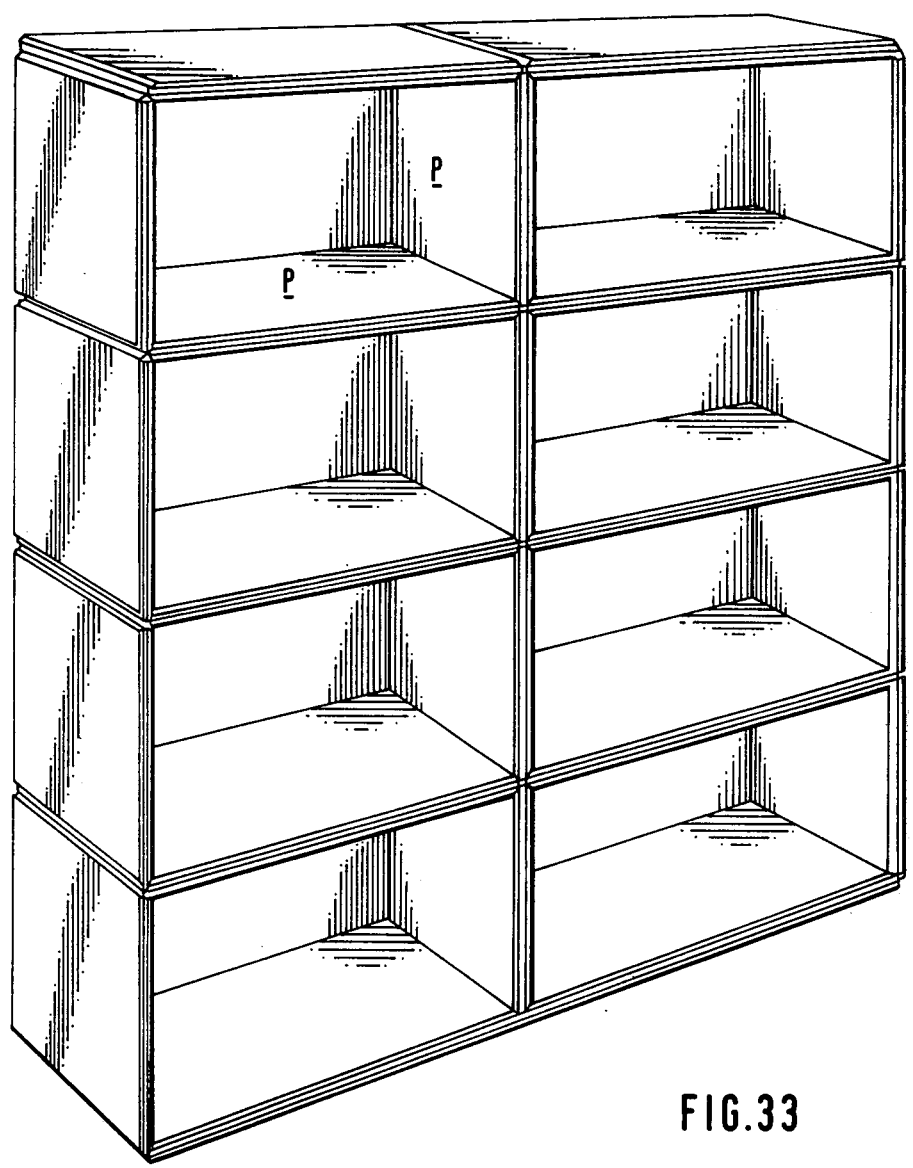
FIG. 33 is a perspective view of a bookcase composed of compartments as shown in FIGS. 31 and 32.
Figure 34:
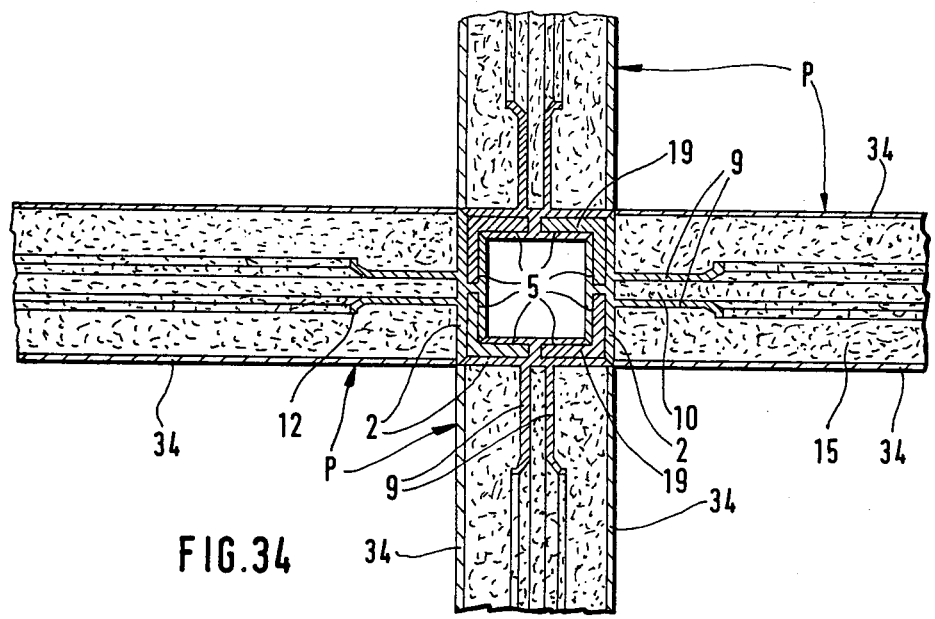
FIG. 34 is an enlarged cross-sectional view of a junction between four compartment walls in the structure of FIG. 33.
Figure 35:
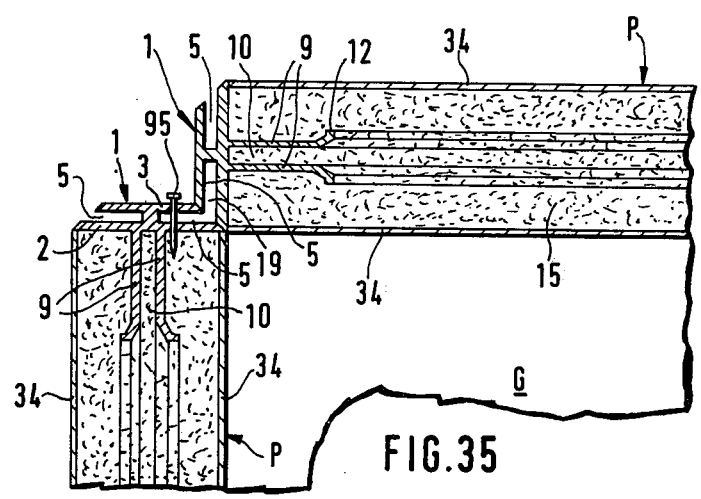
FIG. 35 is a view similar to FIG. 34, illustrating a corner of the structure.

FIGS. 31 and 32 illustrate four rectangular plates P, each framed by four profiles 1, in the process of being interconnected by elbows 19 (cf. FIGS. 7, 8, 10 and 10a) to form a prismatic compartment. A multiplicity of such compartments can be assembled into a bookcase as shown in FIG. 33. FIG. 34 shows the junction of four such plates by as many connectors 19 inserted into the grooves 5 of their profiles; FIG. 35 shows two plates interconnected by one elbow 19 at a corner. The connectors 19 of FIGS. 34 and 35 are, however, duplicated near opposite ends of each profile as will be apparent from FIG. 31. They may be secured in position by locking pins 95 traversing the associated profile flanges 2, 3 as indicated diagrammatically in FIG. 35.

The profiles shown in FIGS. 34 and 35 are of the type illustrated in FIG. 3, with their brackets 9 extending into the interior of the plates P framed thereby. The plates themselves are formed from pairs of parallel sheets 34 held together by a layer of polystyrene foam 15, the brackets 9 being firmly anchored in that foam by their lips 12. The four plates P shown in FIG. 32 may be supplemented by a fifth plate G (FIG. 35) secured thereto in a similar manner to form a box.

Figure 36:
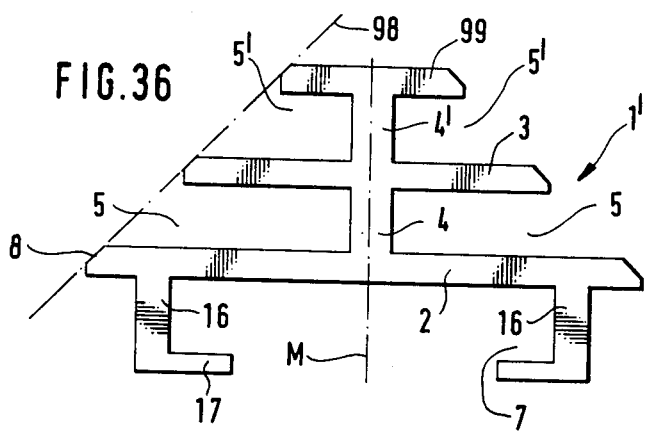
FIG. 36 is an end view, similar to FIG. 2, of a three-flange modular profile according to my invention.

FIG 36 is a view similar to FIG. 1, showing an extruded modular profile 1' with three parallel flanges 2, 3 and 99 of progressively diminishing width which are integral with the common transverse web 4 and an extension 4' of that web defining two pairs of grooves 5 and 5' on opposite sides thereof, these grooves being laterally open. The bevels 8 of the longitudinal edges of flanges 2, 3 and 99 on either side of the profile lie in a common plane which includes a 45° angle with the midplane M. Two elbow-shaped brackets 16 with bent-over lips 17, extending integrally from flange 2 on the side opposite the web 4, again define a partly open channel.

Figure 37:
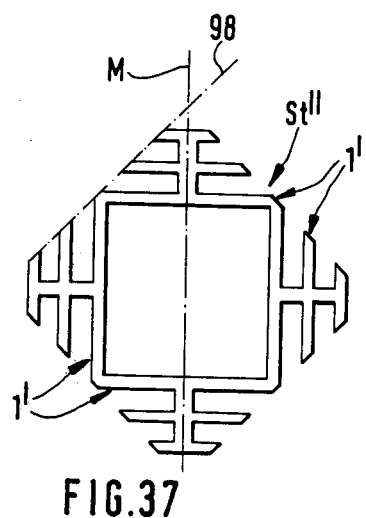
FIG. 37 is an end view, similar to FIG. 4, of a square-section bar composed of four integral three-flange profiles.
Figure 38:
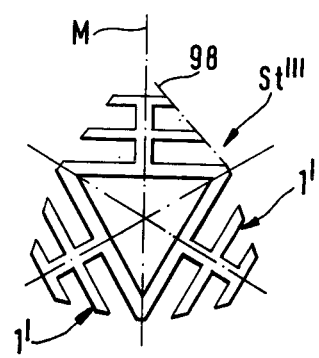
FIG. 38 is a view similar to FIG. 4a, showing a bar of triangular cross-section made up of three-flange profiles.

FIGS. 37 and 38 show two bars St", St''' of polygonal cross-section formed in the first instance by four and in the second instance by three integral profiles 1' which differ from those of FIG. 36 only by the absence of the brackets 16, 17. These profiles thus define a square and a triangular prism, respectively, as in FIGS 4 and 4a. In FIG. 38 the bevel planes 8 include an angle of 60° with the respective midplanes M.

FIGS. 39–41 show an L-shaped connector 119 for joining together two mutually orthogonal profiles 1' in an end-to-end relationship, the meeting ends of the profiles being again beveled at 18 to form a miter joint. Connector 119, which can also be used in lieu of connector 19 in the assembly of FIGS. 7 and 8, has two legs 111 each provided on its inner surface with a recess 112 bounded by a shoulder 113 at its free beveled end 114. The beveled ends 114 are introduced endwise, as shown in FIG. 40, into the channels of profiles 1' which are then pushed together as shown in FIG. 41. The lips 17 of these profiles are shown provided with incisions which enable a tongue 115 to be pushed inward behind the shoulders 113 to lock the connector in place.

Figure 42:
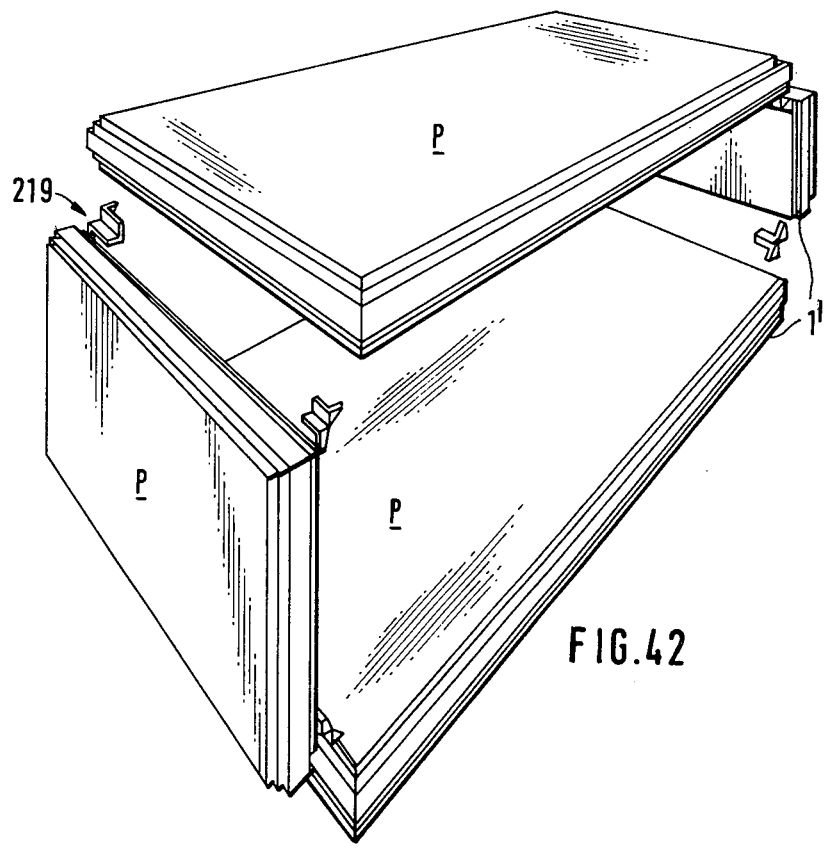
FIG. 42 is a perspective view similar to FIG. 31, showing four plates each framed by four profiles according to FIG. 36 in a disassembled condition together with associated connectors.
Figures 43, 44:
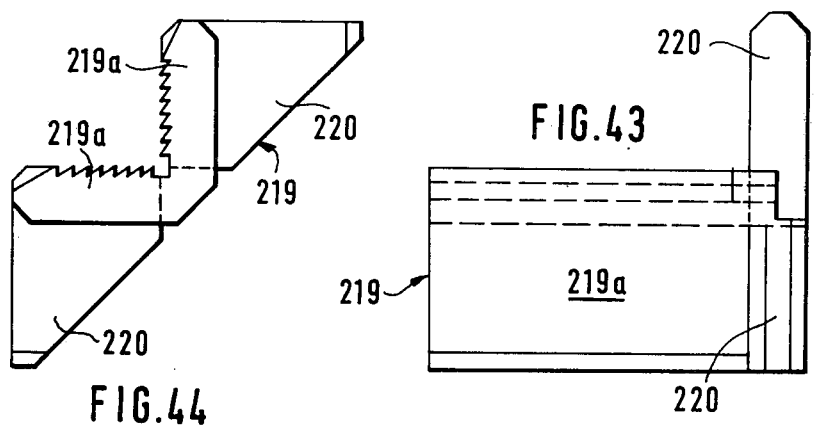
FIGS. 43 and 44 are a side view and an end view, respectively, of one of the connectors shown in FIG. 42.
Figure 45:
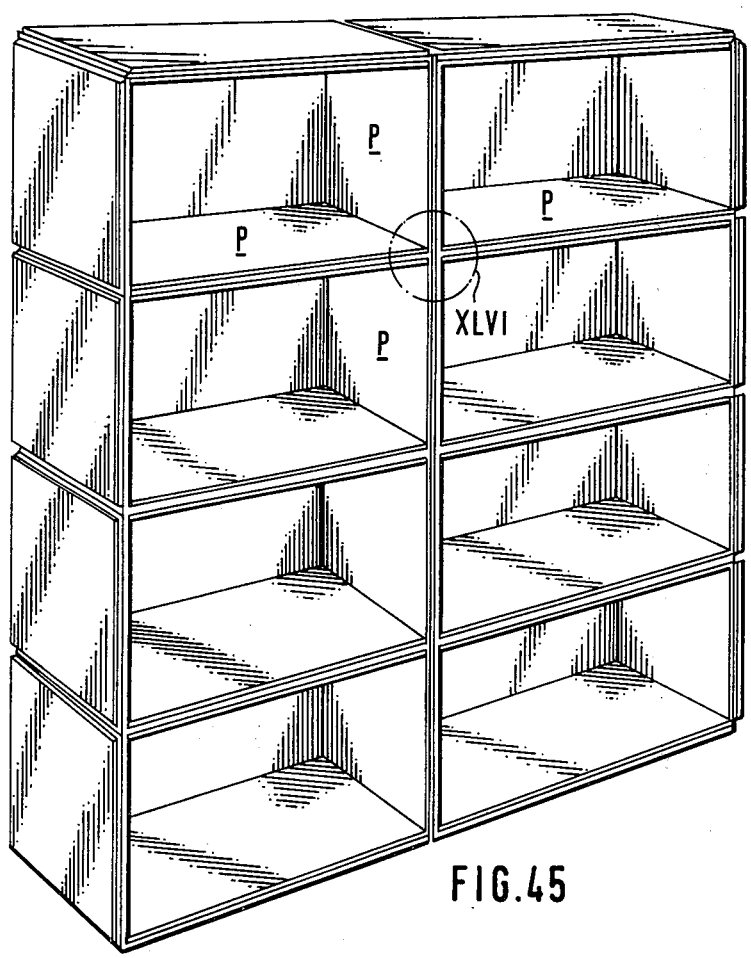
FIG. 45 is a perspective view, similar to FIG. 33, of a storage rack assembled from plates as illustrated in FIG. 42.
Figure 46:
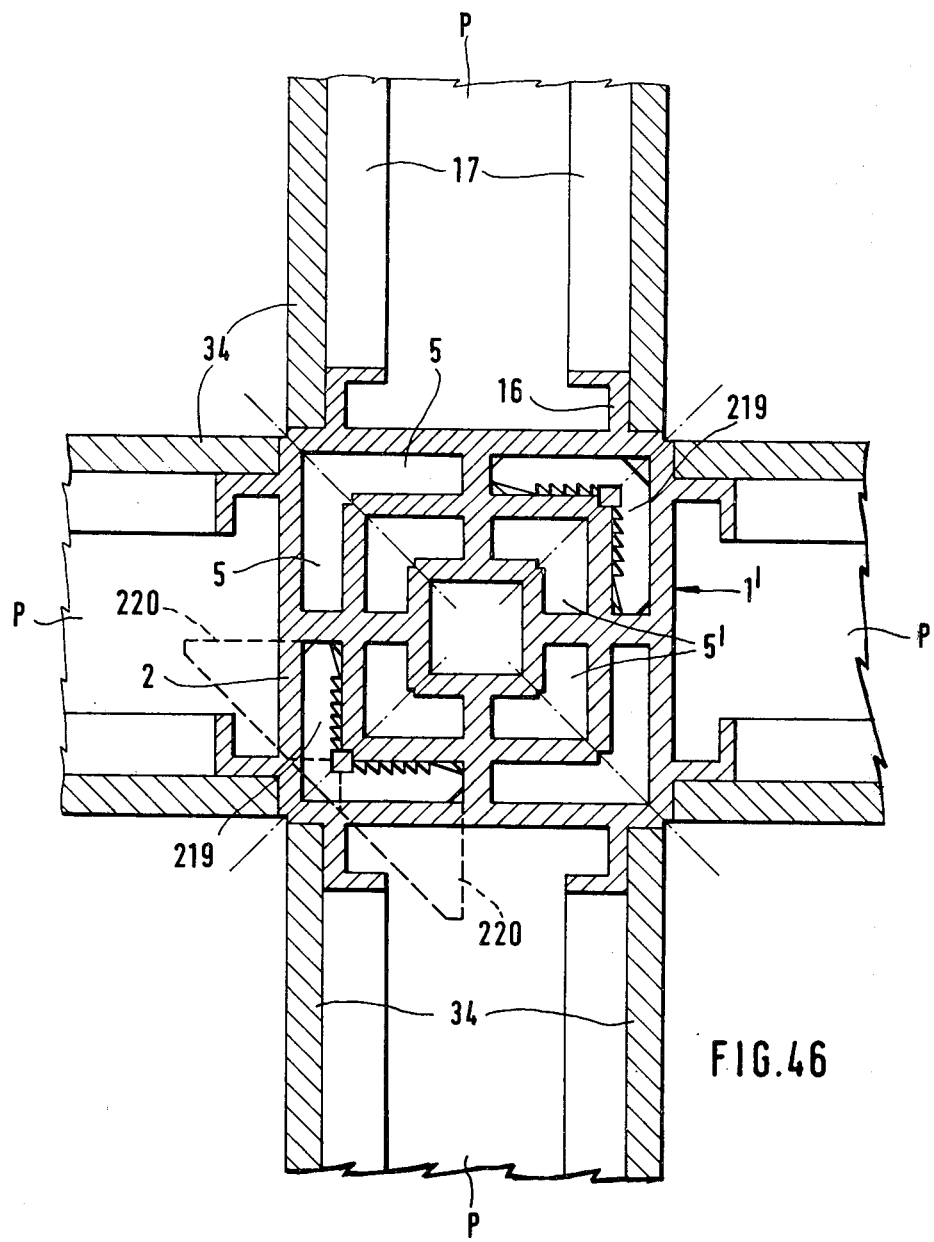
FIG. 46 is an enlarged sectional detail view of an area indicated at XLVI in FIG. 45.

FIG. 42 shows four plates P each bounded along its periphery by a frame consisting of four profiles 1' interconnected in the manner just described. The plates themselves can be joined together by connectors 219 to form a prismatic compartment, e.g. for a rack as illustrated in FIG. 33 or 45. The connectors 219, shown on a larger scale in FIGS. 43 and 44, have legs 219a with serrated surfaces designed to grip the walls of the inner grooves 5 of the plate profiles into which they are inserted from opposite ends (i.e. the ends of a common side of a pair of adjoining frames), as best seen in FIG. 46 which depicts four plates P similar to those of FIG. 42 joined together by four connectors 219 (two of them omitted for clarity). Each leg 219a terminates in a transverse wing 220 which acts as a stop abutting the end of a corresponding flange 2 and which is inserted into a transversely extending groove 5 in an adjoining profile of the same frame. The plates P are thus firmly and exactly held in their mutually orthogonal position; their cover sheets 34 (which may again be held together by foam polystyrene or the like) rest on the brackets 16 of the profiles. Obviously, the connectors 219 can also be used with two-flange profiles 1, as in FIG. 31.

A composite structure such as the rack shown in FIG. 45 may thus be assembled from a multiplicity of plates P.

FIG. 47 shows two horizontal plates P, one above the other, whose framing front profiles 1' have aligned inner and outer grooves 5, 5' receiving a pair of fixed or slidable glass panes S, S'. As illustrated in FIG. 48, the profiles 1' (like the profiles 1) may be molded integrally with plate P from synthetic resin.

Figure 51:
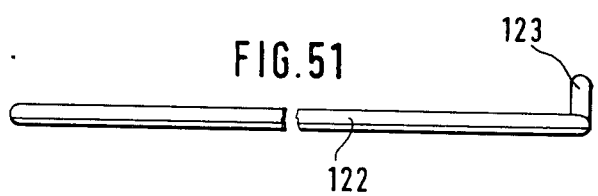
FIGS. 49, 50 and 51 show a glass door for the cabinet of FIG. 47 in front, side and top view.
Figures 49, 50:
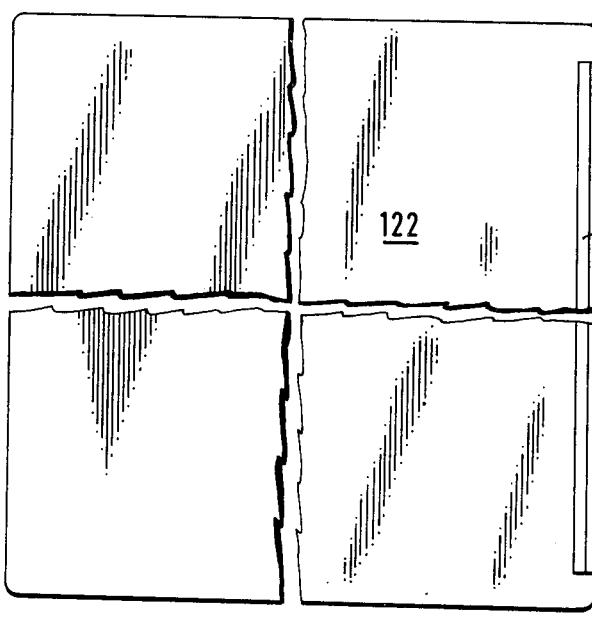

FIGS. 49–51 show a sliding door 122 provided along one vertical edge with a handgrip 123, the door being insertable in two aligned grooves 5 or 5' of FIG. 47 in lieu of one of the panes S, S'; these grooves then form tracks for the door 122.

Figure 53:
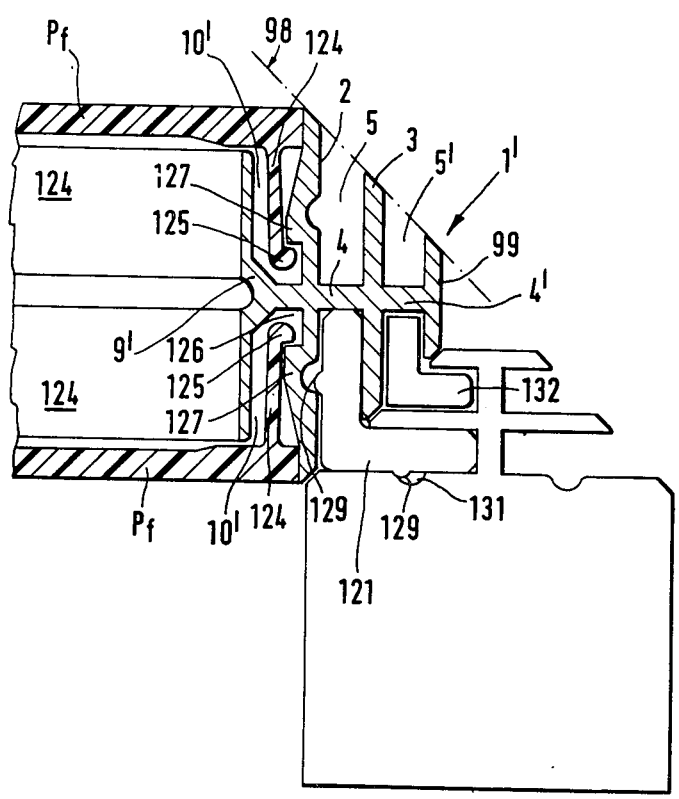
FIG. 53 is an enlarged sectional detail view of an area indicated at LIII in FIG. 52.

FIGS. 52 and 53 show hollow plates P which are framed by profiles 1' of the general type shown in FIG. 36, the first flanges 2 of these profiles carrying supplemental flanges 9' (on the side opposite flanges 3 and 99) forming therewith a pair of channels 10' paralleling the grooves 5, 5'. Two panels $p_f$ with rims 124 are engaged by these profiles, the rims 124 terminating in edge beads 125 receivable in undercuts 126 of profile flanges 2 which are bounded by ridges 127. The edge beads 125 and the ridges 127 thus interengage with a snap fit. Recesses 131 formed on the opposite side of each flange 2 receive, with a similar resilient snap fit, complementary bulges 129 on the legs 128 of angular connectors 121 serving to hold the orthogonally adjoining plates together, jointly with corner links 219. Reinforcing ribs 130 in the interior of each plate P hold the panels $P_f$ separated.

FIG. 53 further shows a smaller L-shaped connector 132 inserted into the outer grooves 5' of adjoining profiles 1'. This supplemental connector 132 strengthens the joint between the two structural members P and may, of course, also be employed in the assembly of FIG. 46.

Naturally, the resilient snap connection between members of the type shown in FIG. 53 can also be used with profiles lacking the third flange 99.

I claim:

1. In a piece of modular furniture, in combination:
   a pair of modular elements in the shape of elongate profiles each provided with three parallel flanges held spaced apart by an integral transverse web, said flanges terminating in beveled edges lying in a common plane, the beveled edges of corresponding flanges of said profiles contacting each other along said plane with formation of two pairs of angularly adjoining grooves between said flanges; and
   a pair of generally L-shaped connectors with legs respectively received in each pair of angularly adjoining grooves for holding said profiles together.

2. The combination defined in claim 1 wherein said legs terminate in a pair of end stops resting against transverse flange edges at the ends of the grooves.

3. The combination defined in claim 2 wherein said profiles are parts of two sets of orthogonally interconnected modular elements framing respective polygonal plates, said end stops being received in grooves of neighboring profiles of both sets.

4. The combination defined in claim 1 wherein the legs of one of said connectors are provided with bulges, one of the flanges of each of said profiles being provided with indentations receiving said bulges with a snap fit.

5. In a piece of modular furniture, in combination:
   a pair of polygonal plates lying in mutually orthogonal planes;
   two sets of modular elements respectively framing said plates, each modular element having the shape of an elongate profile and being provided with at least two parallel flanges including a first flange proximal to the respective panel and a second flange separated from said first flange by an integral transverse web, the flanges of each modular element differing from each other in both length and width and terminating in beveled coplanar longitudinal edges and in beveled coplanar transverse edges, the modular elements of each set adjoining each other along their beveled transverse edge, the resulting frames having a common side defined by one modular element of each set whose flanges contact each other along beveled longitudinal edges; and
   a pair of generally L-shaped connectors disposed at respective ends of said common side, each of said connectors having two legs respectively received in a pair of outwardly open grooves formed between the contacting flanges of the two modular elements defining said common side, said legs terminating in transverse end stops received between flanges of adjoining modular elements of the respective sets to form a corner joint.

6. The combination defined in claim 5 wherein said legs have flange-contacting surfaces provided with serrations parallel to said longitudinal edges.

7. The combination defined in claim 5 wherein each of said plates is unitary with the modular elements framing same.

8. The combination defined in claim 5 wherein each plate is hollow and includes two coextensive panels with upstanding rims, said modular elements having supplemental flanges spaced from their first flanges on the sides opposite said second flanges thereof and defining oppositely facing channel pairs receiving the rims of said panels.

9. The combination defined in claim 8 wherein said rims terminate in edge beads, one of the flanges bounding said channel pairs being provided with undercuts engaged with a snap fit by the edge beads of said panels.

10. The combination defined in claim 8 wherein each plate further comprises reinforcing means between the panels thereof.

11. The combination defined in claim 5 wherein each of said modular element is further provided with a third flange supported parallel to said first and second flanges on an extension of said web, said second and third flanges forming another pair of outwardly open grooves between them.

12. The combination defined in claim 11 wherein said first, second and third flanges are of progressively decreasing width and progressively increasing length.

13. The combination defined in claim 12 wherein said first, second and third flanges have longitudinal edges with coplanar bevels including an angle of not less than 45° with the longitudinal midplane of the profile.

* * * * *